United States Patent [19]
VanHuben et al.

[11] Patent Number: 6,038,651
[45] Date of Patent: Mar. 14, 2000

[54] SMP CLUSTERS WITH REMOTE RESOURCE MANAGERS FOR DISTRIBUTING WORK TO OTHER CLUSTERS WHILE REDUCING BUS TRAFFIC TO A MINIMUM

[75] Inventors: Gary Alan VanHuben, Poughkeepsie; Michael A. Blake, Wappingers Falls; Pak-kin Mak, Poughkeepsie, all of N.Y.

[73] Assignee: International Business Machines Corporation, Armonk, N.Y.

[21] Appl. No.: 09/046,430

[22] Filed: Mar. 23, 1998

[51] Int. Cl.[7] ........................................... G06F 15/16
[52] U.S. Cl. .................................. 712/21; 712/17; 712/28
[58] Field of Search .................................. 712/21, 17, 10, 712/28, 29, 30, 31

[56] References Cited

U.S. PATENT DOCUMENTS

| | | |
|---|---|---|
| 4,156,907 | 5/1979 | Rawlings et al. . |
| 4,200,930 | 4/1980 | Rawlings et al. . |
| 4,939,724 | 7/1990 | Ebersole . |
| 5,168,547 | 12/1992 | Miller et al. . |
| 5,197,130 | 3/1993 | Chen et al. ................................. 712/3 |
| 5,513,325 | 4/1996 | Harris, Jr. et al. . |
| 5,685,010 | 11/1997 | Yoda ........................................ 712/28 |
| 5,878,268 | 3/1999 | Hagersten ................................. 712/28 |
| 5,887,146 | 3/1999 | Baxter et al. ........................... 710/104 |

OTHER PUBLICATIONS

"Interdomain Communication Between VTAM Systems Utilizing Existing SNA Cluster Interfaces" IBM Technical Disclosure Bulletin, vol. 18, No. 12, May 1976, pp. 4176.

"Fast Transaction Processing Interface" IBM Technical Disclosure Bulletin, by Chabanet et al., vol. 33, No. 9, Feb. 1991, pp. 263–265.

Landin, Auders et al., Bus–Based COMA—Reducing Traffic in Shared–Bus Multiprocessors, IEEE, 1996, pp. 95–105.

Lenoski, Daniel et al., The DASH Prototype: Logic Overhead and Performance, IEEE Transactions on Parallel and Distributed Systems, vol. 4, No. 1, Jan. 1993, pp. 41–61.

Lenoski, Daniel et al., The Stanford Dash Multiprocessor, IEEE, Mar. 1992, pp. 63–79.

Michael, Maged M. et al., Coherence Controller Architectures for SMP–Based CC–NUMA Multiprocessors, ACM, 1997, pp. 219–228.

Lenoski, Daniel et al., Design of Scalable Shared–Memory Multiprocessors: The DASH Approach, IEEE 1990, pp. 62–67.

Pramanik, Sekti et al., The NUMA with Clusters of Processors for Parallel Join, IEEE Transactions on Knowledge and Data Engineering, vol. 9, No. 4, Jul./Aug. 1997, pp. 653–660.

*Primary Examiner*—Richard L. Ellis
*Attorney, Agent, or Firm*—Lynn L. Augspurger

[57] ABSTRACT

A remote resource management system for managing resources in a symmetrical multiprocessing comprising a plurality of clusters of symmetric multiprocessors having interfaces between cluster nodes of the symmetric multiprocessor system. Each cluster of the system has a local interface and interface controller. There are one or more remote storage controllers each having its local interface controller, and a local-to-remote data bus. The remote resource manager manages the interface between two clusters of symmetric multiprocessors each of which clusters has a plurality of processors, a shared cache memory, a plurality of I/O adapters and a main memory accessible from the cluster. This remote resource manager manages resources with a remote storage controller to distribute work to a remote controller acting as an agent to perform a desired operation without requiring knowledge of a requester who initiated the work request. Said work is transferred only when a remote requester is available for processing of the work, without a need for constant communication between the clusters of symmetric multiprocessors.

20 Claims, 10 Drawing Sheets

SMP CLUSTERS WITH REMOTE RESOURCE MANAGERS FOR DISTRIBUTING WORK TO OTHER CLUSTERS WHILE REDUCING BUS TRAFFIC TO A MINIMUM

FIELD OF THE INVENTION

This invention is related to computer systems and particularly shows a high speed remote storage cluster interface controller.

BACKGROUND OF THE INVENTION

Historically system architects have used various means to achieve high performance in large tightly coupled symmetrical multiprocessor (SMP) computer systems. They range from coupling individual processors or processor clusters via a single shared system bus, to coupling processors together in a cluster, whereby the clusters communicate using a cluster-to-cluster interface, to a centrally interconnected network where parallel systems built around a large number (ie. 32 to 1024) of processors are interconnected via a central switch (ie. a cross-bar switch).

The shared bus method usually provides the most cost efficient system design since a single bus protocol can service multiple types of resources. Furthermore, additional processors, clusters or peripheral devices can be attached economically to the bus to grow the system. However, in large systems the congestion on the system bus coupled with the arbitration overhead tends to degrade overall system performance and yield low SMP efficiency. These problems can be formidable for symmetric multiprocessor systems employing processors running at frequencies in excess of 500 MHz.

The centrally interconnected system usually offers the advantage of equal latency to shared resources for all processors in the system. In an ideal system, equal latency allows multiple applications, or parallel threads within an application, to be distributed among the available processors without any foreknowledge of the system structure or memory hierarchy. These types of systems are generally implemented using one or more large cross-bar switches to route data between the processors and memory. The underlying design often translates into large pin packaging requirements and the need for expensive component packaging. In addition, it can be difficult to implement an effective shared cache structure.

The tightly coupled clustering method serves as the compromise solution. In this application, the term cluster refers to a collection of processors sharing a single main memory, and whereby any processor in the system can access any portion of the main memory, regardless of its affinity to a particular cluster. Unlike Non-Uniform Memory Access (NUMA) architectures, the clusters referred to in our examples utilize dedicated hardware to maintain data coherency between the memory and second level caches located within each cluster, thus presenting a unified single image to the software, void of any memory hierarchy or physical partitions such as memory bank interleaves. One advantage of these systems is that the tightly coupled nature of the processors within a cluster provides excellent performance when the data remains in close proximity to the processors that need it. For example if the data resides in a cluster's second level cache or the memory bank interleaves attached to that cluster. In addition, it usually leads to more cost-efficient packaging when compared to the large N-way cross-bar switches found in the central interconnection systems. However, the clustering method can lead to poor performance if processors frequently require data from other clusters, and the ensuing latency is significant, or the bandwidth is inadequate.

Until many of the expensive problems related to the central interconnect systems can be resolved in a cost efficient manner, a market will continue to exist for economical systems built around shared bus or cluster designs. The present invention obviates many of the deficiencies with traditional cluster interface designs so that the system can maximize processor performance without the need for expensive high level packages or excessive on-board caches. The prior art in the field relating to the present invention teach various approaches to solving isolated aspects of the overall problem of designing a cost effective, high frequency Storage Controller. However, as shown in the following examples, they fall short in providing a complete solution which meets the objectives bestowed upon the present invention.

A system comprised of two clusters of symmetric multiprocessors is described in U.S. Pat. No. 4,503,497 (issued to Krygowski et al. on Mar. 3, 1985). The invention teaches improved methods of maintaining cache coherency between processors with private store-in caches. However, it doesn't address various issues associated with store-in pipelined Level 2 (L2) caches residing within the cluster, but shared by all processors connected to that cluster. It also fails to focus on maximizing the total efficiency of the cluster interface for all types of operations (processor, I/O, memory, broadcast signalling, cross cluster synchronization, etc.).

An example of a very large SMP system is disclosed in U.S. Pat. No. 5,168,547, issued to Miller et al. on Dec. 1, 1992 and U.S. Pat. No. 5,197,130, issued to Chen et al. on Mar. 23, 1993. Both describe a computer system consisting of a multitude of clusters, each cluster having a large number (ie. 32) of processors and external interface means. Each processor has symmetric access to all shared resources in all the clusters. The computer system achieves its performance objectives by relying on a combination of large cross-bar switches, a highly interleaved shared main memory, a series of inbound and outbound queues to stage transactions until a path between the source and destination becomes available, and a set of global resources within the cluster arbitration means which are used for synchronization and sharing data. The disclosure also teaches an architecture which dispenses from using a hierarchical memory system (including second level caches) to realize a more efficient means of partitioning jobs among a plurality of parallel processors.

Several methods have also been devised for improving overall system performance by clustering a plurality of I/O devices and managing them with intelligent controllers. U.S. Pat. No. 4,156,907 (issued to Rawlings et al. on May 29, 1979) and U.S. Pat. No. 4,200,930 (issued to Rawlings et al. on Apr. 29, 1980) teach an improved Adapter Cluster Module and Data Communications Subsystem which contain firmware enabled I/O processors that offload data and message transfers from the host system. The invention is capable of interfacing with a variety of remote peripherals using a myriad of transmission protocols. The adapter Cluster Module is primarily concerned with translation of "byte" traffic operating under a disparity of protocols, into entire messages that can be transmitted more efficiently using a single protocol to the host system. The invention also employs several reliability and availability features which allow the communications subsystem to continue processing remote peripheral transmissions even when the host system incurs an outage. Although the techniques disclosed can certainly improve performance problems at the I/O subsystem level, they fail to address the need for high speed data transfer between two processors or one processor and main memory in a host computer system.

Several inventions exist which address pieces of the overall problem solved by the present invention, but none address all of the facets. More importantly, a concatenation of the ideas disclosed in this inventions does not impart the degree of overall efficiency provided by the present invention. For example, U.S. Pat. No. 5,392,401 (issued to Barucchi et al. on Feb. 21, 1995) teaches improved methods for transferring data between two processors. However, the invention relies on the use of a cross-bar switch. and doesn't teach cache coherency of shared second level caches. U.S. Pat. No. 4,445,174 (issued to Fletcher on Apr. 24, 1984) teaches a means for interlocking processors with private caches and a shared Level 2 (L2) cache, but doesn't address bandwidth and latency problems associated with cluster-to-cluster interfaces. U.S. Pat. No. 5,185,875 (issued to Chinnaswamy et al. on Feb. 9, 1993) teaches a method to reduce data transfer latency between storage control units by routing the data to the requested processor in parallel to loading it into the cache. Although similar techniques are widely used in the design of computer systems today, this invention doesn't solve the problems created when the storage control unit can't afford a dedicated pin interface for each system resource (including I/O and memory) that requires access to the cache. U.S. Pat. No. 4,785,395 (issued to Keeley on Nov. 15, 1988) teaches a method for sharing a cache among at least a pair of processors. However, it assumes all processors can access the cache with equal latency.

Several inventions describe techniques for arbitrating traffic in a shared bus system where individual processors or clusters of processors communicate to main memory and external I/O devices through a shared bus. For example, U.S. Pat. No. 4,785,394 (issued to Fischer on Nov. 15, 1988) describes a method for arbitrating usage of a shared bus. Their technique involves giving a responder preference over an initiator and allowing requests to be initiated to a receiving module, even if it is busy. The present invention improves on this arbitration operation by busying the cluster-to-cluster interface only when resources on the remote side can accommodate the work. In addition, arbitration between responders and initiators is performed dynamically each cycle with no fixed preference. U.S. Pat. No. 4,570,220 (issued to Tetrick et al. on Feb. 11, 1986) utilizes a combination of serial and parallel busses to comprise the system bus. The bus is shared among several "agents", where an agent must engage a handshaking sequence to acquire the right to use the bus. The present invention tracks the remote resources such that it can dynamically initiate new requests on a single clock cycle without the need to perform any type of bus negotiation.

SUMMARY OF THE INVENTION

The present invention describes a means for managing the interface between two clusters in a bi-nodal SMP system. The preferred embodiment is incorporated into an Symmetric Multiprocessing System comprising a plurality of Central Processors, (CP) each having a private L1 cache, a plurality of I/O Adapters, and a main memory wherein any Processor or I/O Adapter can access any portion of the memory. The total number of Processors and I/O Adapters are divided equally into two clusters. In addition, the main memory is comprised of banks or interleaves, half of which are attached to each cluster.

Within each cluster there exists a Storage Controller which consists of a shared second level cache, various controllers, and discrete interfaces (or ports) to every Processor, I/O Adapter, and the main memory. The cache represented in the present embodiment is comprised of a plurality of banks or interleaves and the contents are managed by an 8-way associative directory. The Storage Controller depicted in FIG. 1A illustrates the major functional elements and will be described further in the detailed description of the preferred embodiment. However, a brief overview of the Storage Controller within a single cluster is beneficial in understanding the aspects of the present invention.

The primary function of the Storage Controller is to process data fetch and store requests to and from main memory from the Processors and I/O Adapters. Since the Storage Controller contains a shared second level cache, which is architecturally invisible to the software and operating system, the Storage Controller is responsible for performing directory and cache accesses. All incoming requests enter a port on the Storage Controller, where they are received by a Central Processor (CFAR) or I/O Controller. These controllers generate requests into a Central Priority unit which arbitrates among them and chooses one of the requesters to enter into one of two multistage Pipelines based on the address. During each stage of the pipeline the requestor accesses and/or reserves various resources such as the cache, the Local Cache Fetch/Store Controllers, the data path controls, data path fifo buffers, the Remote Cache Fetch/Store Controllers, etc.

As requests exit the pipeline, one of the Local Fetch/Store Controllers assumes responsibility for managing the operation through completion. Often this requires additional passes through the pipeline, therefore a Local Fetch/Store Controller must also participate in Central Priority arbitration, and is also considered a requester. In the present embodiment, we include the Cache Controller and the Main Memory Controller, as part of the Local Fetch/Store Controllers, Between them they contain all the resources (including data path elements such as fifo buffers and crosspoint switches) necessary to access data from the cache interleaves, process data accesses to main memory when cache misses occur, perform store operations into the cache interleaves, and cast out aged data (using a Least Recently Used method) from the cache into main memory in order to make room for incoming data from main memory accesses.

As stated above, the main memory banks are physically distributed between the two clusters of the bi-nodal system. However, the main memory appears as a single unified entity to any of the Processors or I/O Adapters located anywhere in the SMP system. Therefore, the present embodiment incorporates an additional set of controllers, as Remote Fetch/Store Controllers. The Storage Controller keeps track of which main memory addresses are assigned to the memory banks on each cluster. Whenever data accesses (fetch requests) miss the cache on the local cluster, (where the term local refers to the cluster to which the originating Processor or I/O Adapter is attached), the Local Fetch/Store Controller must interrogate the remote (or "other") cluster to see if the data resides in that cache. These remote interrogations are processed by the Remote Fetch Controllers, which make requests into Central Priority and access resources in a similar fashion to the Local Fetch/Store Controllers.

In addition, if the data access misses the remote cache, but the address denotes that it belongs to a memory bank attached to the remote cluster, the Remote Fetch/Store Controller also interacts with the Main Memory Controller to initiate main memory accesses. For operations which necessitate storing data into memory (such as casting aged data out of the cache), the address once again determines whether the Local Fetch/Store Controller can process the entire operation or if a remote store operation must be initiated across the bi-nodal interface. In this situation, the remote store operations are processed by the Remote Store Controller who also interacts with the Main Memory Controller to store the data into the memory interleaves. As with the Local Fetch/Store Controllers, their remote counterparts also contain all the resources (including data paths, fifo buffers, and crosspoint switches) necessary to process inter-cluster operations.

The present invention pertains to a remote management system for managing the resources comprising the aforementioned Remote Fetch/Store Controllers, and to distribute work to these Remote Fetch/Store Controllers, who in turn, act as agents to perform the desired operation without requiring knowledge of the requester who initiated the work request. Work is distributed only when a remote resource is available for processing the work, without a need for constant communication between multiple clusters of symmetric multiprocessors. It uses a minimum of interface communication signals.

Our remote resource management system manages the interface between two clusters of symmetric multiprocessors in a highly efficient manner using a reduced number of input and output pins. Several techniques are employed to overcome the pin limitations and still permit integration within a very complex computer system such as an S/390 Enterprise Server, in which a single cluster can contain a multitude of very high frequency processors, a shared Level 2 cache, several I/O adapter means, and a main memory. In such a system, performance is paramount, and latencies associated with cache misses must be minimized. Thus, the current invention seeks to maximize overall system performance while minimizing the cost of the packaging.

To begin with, a single interface unit on each cluster is responsible for complete control of the interface. This includes prioritizing queued requests, sending new operations across the interface, handling returning responses from the other side, and overseeing the transfer of all data between the clusters. Due to the limited number of control I/O, our invention uses a novel combination of remote resource management coupled with command remapping to minimize the amount of information that needs to be transmitted. The local Interface Controller not only initiates the work request to the remote side, but manages the fetch/store controllers on the remote side, thereby immediately routing the new operation to an available controller. The remote fetch/store controller simply becomes an agent who works on behalf of the local interface controller, who in turn works on behalf of a requestor. By operating in this manner, it eliminates the need to send information identifying the owner of the operation, since the remote side has no reason to know.

Further simplification of the remote controllers is achieved through a command remapping operation which permits several local operations to be combined into a single atomic remote operation. For example, a processor fetch request for a read-only copy of data, and fetch request for read-only data including a storage protection key, require the fetch controller on the remote cluster to utilize identical state diagrams and cache management operations. Therefore, the interface controller will remap both of these into a single simplified Remote Storage Cluster (RSC) Interface Controller command known as a Read Fetch, thus reducing the number of operations that must be handled by the Remote Storage Cluster Interface Controller (RSC).

An additional advantage of this remapping operation is the ability to manage the interface data paths more efficiently by eliminating unnecessary data transfers. Consider a 64 byte I/O Store which requires the incoming 64 bytes to be merged with the most recent copy of the same line of data prior to being stored into main memory. This operation can result in three different scenarios depending on the target main storage address and the current cache state:

1. If the data targets main memory on the remote side and misses the local cache, then the I/O Store data must be sent to the other side for merging. This would necessitate the RSC Interface Controller (RSC IC) performing a store operation from the local cluster to the remote cluster.
2. If the data targets the local memory, but hits in the remote cache, then the line needs to be retrieved from the remote side in order for the merge to take place on the local cluster. This necessitates a cross interrogate to the remote side along with a possible data fetch.
3. If a copy of the line exists in both caches, then the only required action is to invalidate the line in the remote side, since the incoming 64 bytes can be merged with the copy in the local cache.

A simpler design would be to send the I/O Store command with the 64 bytes of data, unconditionally, across the interface. The Remote Fetch/Store Controller on the other side would then perform the necessary action based on the directory status. However, in two of the three cases, transferring the store data would unnecessarily tie up the local-to-remote data bus. Additional control lines would also be required to send the directory information. Our invention employs an intelligent Interface Controller which remaps the last two cases into "force cast out" and "read-only invalidate" commands respectively.

Command remapping offers several advantages. First, it simplifies the Remote Fetch/Store controller design since many operations can be mapped into a subset of simpler atomic interface operations. Secondly, no additional control I/O is required to send directory information between the clusters. Third, to prevent any increase in latency, the command remapping is performed within the same cycle that priority is issued for a new command to cross the interface.

The remote management system is designed to interface with a high-end Storage subsystem that contains a large number of fetch and store controllers servicing a single or a plurality of pipelined Level 2 caches. A series of priority stations is used to ultimately select a request to send across the interface. When multiple pipes are involved, a pre-priority station in each pipe chooses one of fetch or store request to forward to the RSC IC. During the same cycle, the RSC IC employs a high performance priority operation to select the optimal request based on command type and resource availability. Since multiple pipes can request use of the interface on any given cycle, the operation will favor a fetch over a store as long as a remote fetch controller is available. Otherwise, the store will be taken as long as a remote store controller is available, and a data path is available for those store operations which require one. If both requests are fetches, and both have available resources, a simple round robin determines which request is honored. In the case of both requests being stores, the winner is determined by whichever pipe has the available resources. Once again, if both have all the available resources, the simple round robin is used. This method virtually guarantees that a command will be transmitted as long as there are work requests and available resources. In addition, the preferential treatment afforded to processor fetches improves overall system performance. Finally, management of the remote resources within the local Interface Controller, ensures that interface cycles will not be wasted transmitting work that winds up being queued on the remote side.

To further reduce processor data access latencies due to Li cache misses, the RSC IC employs a "fast-pathing" technique during cycles where no fetch or store controller is requesting use of the interface. During these cycles, all pipes are monitored for valid CP fetches. If one is found, it is immediately dispatched to the remote side, while the local cache fetch controller is being loaded in parallel. This allows a fetch request to get a one cycle head start to the remote side, thereby reducing the latency of the returning data.

Since a large disparity can exist between the best-case latency for data fetches that hit the remote cache versus data accesses from local main memory, the RSC IC has the ability to communicate remote cache hits to the local fetch controller, thereby allowing the main storage access to be cancelled. This contributes to overall system performance by freeing up memory banks to work on another request.

The RSC IC employs both a synchronous and asynchronous response bus to maintain cache coherency while maximizing performance. Because it's impossible to determine the exact number of pipe cycles to complete an operation prior to the request testing the cache state on the remote side, an asynchronous response bus is used for all final responses. These responses mark the official end of the remote operation and are often forwarded to the original requestor. In addition, the final responses are tagged with data modification information (line change status) which permits the local directory to be updated with the correct final state. Since the final response can be delayed due to contention for a single final response interface bus, performance can be improved by reporting the result of the initial remote cache cross interrogation (XI) as soon as it's known. The RSC is always able to report this XI result in the minimum timeframe using a synchronous XI response bus. This is made possible because the SC's Central Priority station guarantees that any new request received from the remote side will be immediately admitted into the appropriate pipeline. The initial directory look-up is performed in a fixed pipe cycle and the results are shipped back across the XI response bus. The Interface Controller who initiated the operation knows an XI response will be available in a fixed number of future cycles, so a simple staging mechanism is used to forward the hit/miss result to the requesting fetch/store controller.

In addition to managing the control interface, the RSC IC also manages all cluster to cluster data flows. The present invention contains enough data flow I/O to permit each pipe to transfer 16 bytes per cycle in both directions, and the RSC IC is capable of exploiting the potential 64 bytes per cycle maximum throughput. Although there are two unidirectional data paths, a given data path must serve as a conduit for store data going from cluster A to cluster B and returning fetch data from cluster B to cluster A. The RSC IC not only prevents collisions, but does so without reserving the bus in advance. This, in turn, allows the RSC IC to compare requests from the local Store controller with requests from the resident Remote Fetch controller to trying to return fetch data. During cycles where both compete for the data path, preference is given to the returning fetch data. Once again, this aids in overall system performance. Furthermore, in the case where fetch data is acquired from the remote main memory, the RSC IC monitors the corresponding data path as the data is accessed from the memory banks. If the RSC data path is available, the data will bypass the remote fetch buffer, thereby reducing the normal latency associated with temporarily buffering the data.

We have proved a method for improving management of Remote Storage Controller resources that have been replicated to improve overall system throughput. For example, one technique that is used to maximize the efficiency of successive fetch requests that hit the remote cache is to alternate work requests between the duplicate Remote Fetch resources. All fetches terminate with a final response that coincides with the first 16 bytes of data being transferred. The advantage is it enables that Remote Fetch resource to be immediately assigned to a new piece of work while the remote fetch controller's buffer is still being emptied. The drawback appears when the new piece of work is also a data fetch that hits the remote cache. Because the buffer may still be emptying, the remote fetch controller must recycle the request through the pipe until the buffer becomes available. The RSC IC abates this scenario by sending the second fetch request to the duplicate Remote Fetch controller, if it's available. This allows the second Remote Fetch controller to begin loading its buffer, while the first buffer is still completing its data transfer. This permits the second buffer to transfer its data across the interface immediately upon completion of the first buffer's transfer.

The Remote interface also exhibits a high degree of reliability, and availability by allowing many operations to be retriable in the event an operation can't complete successfully on the remote side. These types of problems fall into two major categories: remote rejects and interface errors. An operation may be rejected by the remote cluster to avoid a potential cross-cluster deadlock. These deadlocks can occur when there are more storage subsystem fetch and store controllers than RSC resources to service them. The remote fetch and store controllers contain a deadlock avoidance mechanism designed to monitor operational sequences which can result in a cross-cluster deadlock. Upon detecting such a scenario, the controller will reject the pending operation by returning a special reject response back to the initiating cluster. The RSC IC will, in turn, forward the reject to the originating fetch/store controller so the operation can be retried. Operations can be continuously rejected and retried until the deadlock window disappears. The other type of recovery occurs when an interface parity error is detected on any of the control information accompanying a new RSC operation. A synchronous interface is used to transmit interface error status within a fixed number of cycles after the command is sent. In the event of an error, the originating fetch/store controller is notified and subsequently determines the eligibility for recovery. The RSC IC automatically resets the corresponding RSC resource to permit the operation to be requested again. These and other improvements are set forth in the following detailed description. For a better understanding of the invention with advantages and features, refer to the description and to the drawings.

Although the present invention is being described in association with the present preferred embodiment, one skilled in the art will appreciate that the concepts disclosed herein are applicable to systems comprising more than two clusters, and utilizing Storage Clusters differing from our present embodiment. Additionally, the present invention contemplates alternate Storage Controller embodiments with a different number and configuration of functional units, including, but not limited to, the cache structure, the main memory organization, the number and size of data path resources (such as buffers, control busses, etc.), the composition of the various controllers, and the number and size of the Pipelines.

(Note: For convenience of illustration, FIGURES may be separated in parts and as a convention we place the top of the FIGURE as the first sheet, with subsequent sheets proceeding down and across when viewing the FIGURE, in the event that multiple sheets are used.)

DETAILED DESCRIPTION OF THE INVENTION

Figure 1A:
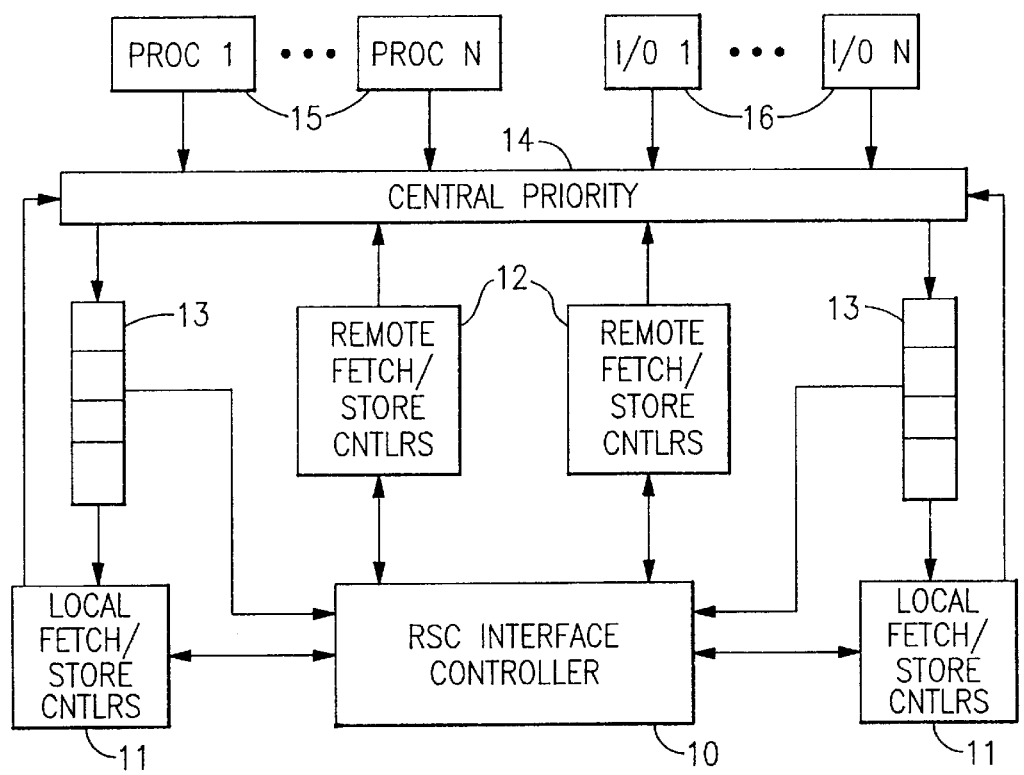
FIG. 1a depicts a single Storage Controller cluster of a bi-nodal symmetric multiprocessor system.

FIG. 1a depicts a single Storage Controller cluster of a bi-nodal symmetric multiprocessor system. The present invention is represented as the Remote Storage Cluster Interface Controller (RSC IC 10) which interacts with a twin set of Local Fetch/Store Controllers (11), Remote Fetch/Store Controllers (12) and Centralized Multistage Pipelines (13). These Pipelines are fed by a Central Priority (14) Station which prioritizes asynchronous work requests emanating from N Central Processing Unit Controllers (15) or N I/O Adapters Controllers (16). Each CPU Controller has an affinity to a particular Central Processor (CPU) in the SMP system. The Pipelines comprise a shared Level 2 store-in cache to which all Central Processing Units, I/O adapters and Local and Remote Fetch/Store Controllers have read and write access. The cache coherency operation employed in the preferred embodiment permits data to reside in the cache in a read-only state which permits all processors and I/O adapters on both clusters to access copies of the data, or an exclusive ownership state whereby a single processor can own the data at any time. Any processor on any cluster may request ownership of data at any time, even if another processor currently owns that data.

The preferred embodiment utilizes a dual pipeline design in which the Central Pipelines (13), Remote Fetch/Store Controllers (12) and Local Fetch/Store Controllers (11) are all duplicated. The concepts disclosed in the present invention are independent of the surrounding structure of the Storage Controller (SC) and can be just as effectively implemented in a more traditional single pipeline SC design or a less traditional SC design employing three or more pipelines. One skilled in the art will appreciate how the RSC IC (10) interfaces and internal functional blocks can be easily scaled to adapt to almost any SC structure.

Figure 1B:
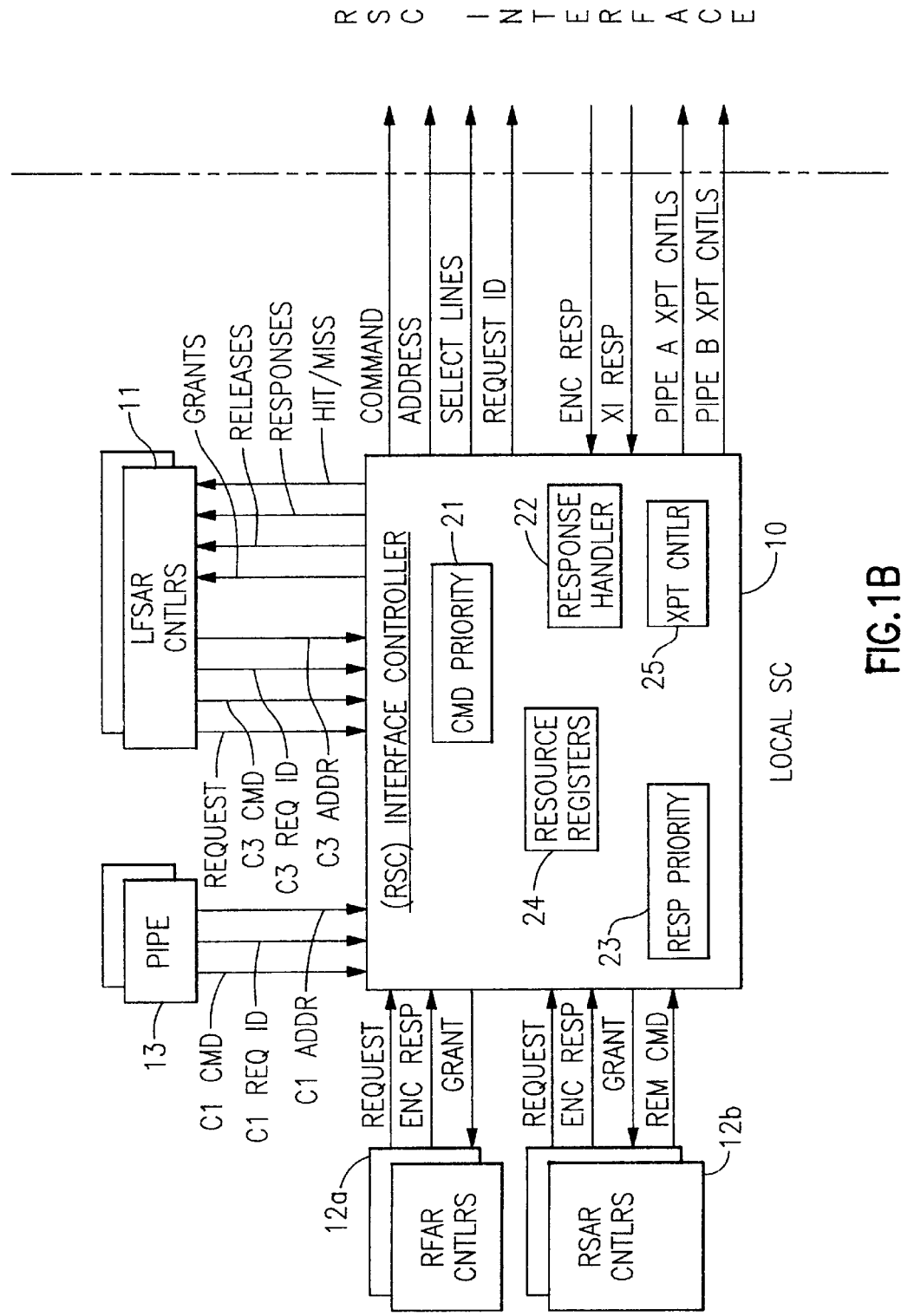
FIG. 1b depicts the Response Handler responsible for handling all response traffic returning from the remote cluster, the detailed interfaces and the sub-units that comprise the remote storage controller RSC IC (10), and also shows interfaces between the Remote Fetch/Store Controllers (12) and the RSC IC.

The RSC Interface Controller (10) is comprised of several sub-units which interact with various SC functional units. Since there is only a single Remote Storage Cluster interface to service requests from twin sets of Pipelines (13) and Fetch/Store Controllers (11,12), the solitary RSC IC has to accommodate a multitude of local interfaces as well as the cluster-to-cluster interface. In addition, it has to manage traffic flowing from the local cluster to the remote cluster as well as traffic flowing from the remote cluster. FIG. 1b depicts the detailed inter-faces and the sub-units that comprise the RSC IC (10).

Due to the nature of the Storage Controller in the preferred embodiment, the majority of the requests come from the Local Fetch/Store Controllers (11). These requests are broken down into fetch requests known as LFAR requests, and store requests known as LSAR requests. In the preferred embodiment there are 4 LFAR arid 4 LSAR requesters for each Pipeline, thus totalling 16 possible LFSAR requestors vying for use of the RSC interface. A pre-priority station within the LFSAR Controllers chooses one requestor from each pipe and forwards, at most, two requests to the RSC IC on any one clock cycle. Once again, the spirit of the present invention would permit any number of LFAR and LSAR requesters, distributed among any number of Pipelines. In addition, the pre-priority station within the LFSAR Controllers (11) can be incorporated directly into the Command Priority unit within the RSC IC.

Turning our attention to the interface between the LFSAR Controllers (11) and the RSC IC (10), there exists one interface for each set of Controllers associated with a Pipeline. Each interface consists of a Request bus, C3 Command bus, C3 Requestor ID bus and C3 Address bus. The 8 bit Request bus contains one bit for each LFAR and LSAR requester, of which only one bit can be active on any cycle. This bit denotes the ID of the LFAR or LSAR controller chosen by the pre-priority station on that cycle. The corresponding busses convey the command, address and ID of the CPU, I/O Adapter or SC Controller which initiated the command into the Pipeline. All of this information is presented to the RSC IC on the C3 cycle which corresponds to the third stage of the Pipeline. If the RSC IC is unable to honor an LFSAR request on the cycle it's presented, the LFSAR Controllers may continue presenting the same request or dynamically select a new request on the next cycle.

In addition to the LFSAR Controllers, the Pipelines (13) themselves also serve as requesters which permits an operation called Fast-Pathing. Fast-Pathing enables the RSC to monitor both pipes and launch a remote fetch operation if one is required and no work is pending from either of the LFSAR Controllers (11). The C1 Command, C1 Address, and C1 Requestor ID is obtained from the first stage (C1 cycle) of each pipe and sent to a pre-priority station within the RSC Priority (21) subunit of the RSC IC. The output of the pre-priority station is forwarded to the main priority station (also located within the RSC Priority (21) subunit. where it competes with the requests from the LFSAR Controllers (11).

On each cycle the RSC Priority (21) station examines the pending work requests and uses a high performance operation to determine which request should be permitted to cross the interface. Upon choosing one, a grant is sent to the LFSAR Controller (11) corresponding to the Pipeline of the selected operation. The grant indicates whether the chosen operation was a pending request from the LFSAR Controller (11) or a Fast-Path operation initiated from the Pipeline (13). While the grant is being issued to the LFSAR Controller, the chosen Command along with it's associated Address, Requestor ID, and tag lines indicating the RSC Resource are sent across the RSC interface to the remote cluster.

All RSC operations require some type of completion response from the remote cluster. In addition, data fetches also require a Cross Interrogate (XI) response indicating whether the requested data is present in the remote cache. All responses are processed through the RSC IC (10) and either forwarded directly or indirectly to the original requester. Most of the time the responses are decoded and appropriate status, release and cache coherency information are passed on to the LFAR or LSAR controller. However, many operations involve sending the response back to the original CPU Controller (CFAR 15). Regardless of the final destination of the responses, the RSC IC tracks all the necessary information for every operation such that response information for all RSC operations can be multiplexed over a single Encoded Response bus. The RSC IC receives incoming responses into the Response Handler (22), whose job it is to decode the response and transmit the appropriate information to the LFSAR Controllers (11) or the CPU Controller (15)

FIG. 1b also shows interfaces between the Remote Fetch/Store Controller (12) and the RSC IC. The Remote Fetch/Store Controller is broken down into separate Remote Fetch (RFAR 12a) and Remote Store (RSAR 12b) Controllers. The Remote Fetch Controller (12a) is responsible for receiving fetch requests from the other cluster, processing them through the Pipeline (13) and returning the data (if possible) along with the necessary response information. The Remote Store Controller (12b) is responsible for receiving incoming store operations (arid any accompanying data), processing them through the Pipeline (13), and returning the necessary response information. Each Pipeline has an RFAR (12a) and an RSAR (12b) Controller associated with it, therefore a maximum of four requests can be presented to the RSC IC to return information on the Encoded Response bus in a given cycle. The Response Priority (23) sub-unit within the RSC IC arbitrates among these requests and manages the traffic on the Encoded Response bus. If an RFAR Controller needs to return fetch data, the Response Priority (23) station communicates with the RSC Priority (21) and XPT Controller (25) to ensure a data path is available.

One of the key aspects of the present invention is the use of Resource Registers (24) to track all the remote activity on the local side. In order to minimize the interface I/O and maximize throughput, the RSC IC acts as an agent for the original requester on the local side. It tracks the RFAR and RSAR resources on the remote side eliminating the need for constant cluster-to-cluster communication. The Resource Registers (24) interact with the RSC Priority (21) station to ensure that an operation is initiated only if an RSC resource is available. Upon initiating an operation, the RSC IC marks the chosen RFAR or RSAR as "in use", and that resource remains in use until a response is received indicating completion of the operation. These responses are then used to reset the resource and make it available for a new operation.

In the preferred embodiment, there are a total of 8 RSC Resource Registers, (24) comprised of 2 RFARs and 2 RSARs for each Pipeline. Each of the two RFARs/RSARs are identical to one another and exist primarily to improve performance by allowing multiple remote fetch and store operations to be processed simultaneously by each pipe. Once again it will be noted that the present invention does not require, nor is it limited to, 2 RFARs and 2 RSARs per pipe. All remote resources are tracked in the same manner regardless of the number in existance.

Prior to selecting an operation, the original Pipeline command undergoes translation to an RSC command. In many cases the resulting RSC command is identical to the original command, but in certain cases the command code point is remapped to allow similar operations to share a single RSC code point. This step also ensures that all RSC fetch commands fall within a contiguous range ('01'x–'1F'x in the preferred embodiment), while all store commands fall within a different contiguous range ('20'x–'3F'x in the preferred embodiment). Upon initiating an operation, the RSC IC uses two select bits to indicate to the other side which of the 8 resources should service the newly selected operation. The two bits refer to the Pipeline and which of the twin resources within that Pipeline should process the command. Bit 0 of the command determines whether the command is a fetch type (bit 0=0) or a store type (bit 0=1). All fetch commands are serviced by RFARs while stores are processed by RSARs. Since the command and address must always be transmitted, this approach necessitates only two additional interface control bits, transmitted only once, to synchronize both sides. It should also be noted that the preferred embodiment depicts an RSC interface bus to transmit the Request ID in addition to the Command, Address and Select Lines. This Request ID is purely information which is being passed through the RSC interface and forwarded to a requester such as a CPU Controller or I/O Adaptor Controller on the remote side. The techniques employed by the present invention do not require any knowledge of the original requestor's ID in order to achieve the objectives set forth in the claims.

The final sub-unit is the Cross-point (XPT) Controller (25), who is responsible for managing the four data paths connecting the clusters. In the preferred embodiment, there are two unidirectional data paths for each pipe, thus allowing four data transfers to occur simultaneously. Each data path has it's own XPT bus such that the four operations can occur simultaneously. The data paths are 16 bytes wide, and can transfer a quadword (16 bytes) every cycle.

RSC Command Translation

One of the goals of the present invention is to exploit the use of remote resource management to minimize the size and complexity of the Remote Fetch/Store Controllers (12) as well as the amount of information that must be exchanged across the cluster-to-cluster interface. In high-end SMP systems with complex Storage Controllers virtually every command that can be initiated within a local cluster can also be sent across the interface for processing on the remote cluster. When these commands are decomposed into a series of atomic operations, one finds that the RSC Fetch/Store Controller (12) on the remote side can use identical state machines to process several similar commands. Therefore, in order to simplify the RSC design, some of the original commands on the local side are remapped into an equivalent "base" RSC command. For example, a "fetch exclusive with storage protect key" results in the same Pipeline sequences and directory update actions as a "fetch exclusive without key". Therefore, the RSC Interface Controller will remap a fetch exclusive with key command ('06'x) into a simple fetch exclusive command ('02'x) prior to sending it across the interface.

Figure 2:
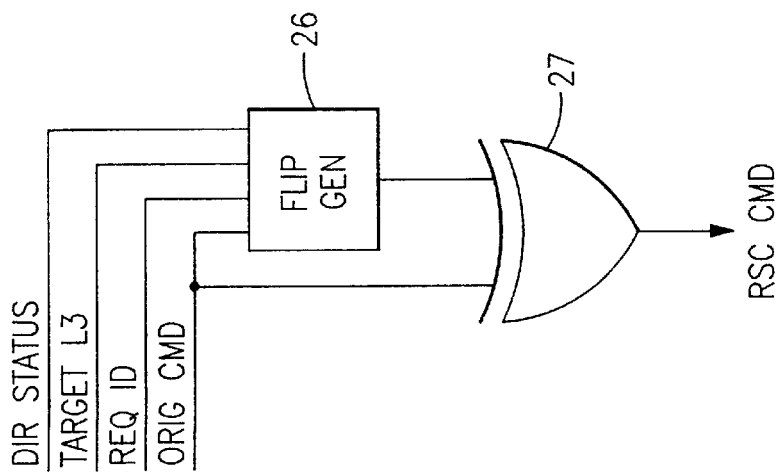
FIG. 2 illustrates the preferred embodiment implementation of the Command Translation in hardware.

The preferred embodiment implements the Command Translation in hardware as shown in FIG. 2. The original command enters the Flip Bit Generator (26) which is comprised of the logic gates required to implement the Flip Bits column of the Command Translation Tables (28). The original command is combined with the Directory Status and the Target L3 to determine which bits, if any, need to be flipped. The resulting Flip Bits are exclusive or'd with the original command in the XLAT (27) block to produce the desired RSC Base Command shown in the RSC Command column of the Command Translation Tables (28).

The RSC Command Translator is designed to perform the translation within a single clock cycle and is an independent functional unit. Therefore, one skilled in the art can appreciate the flexibility with which this can be employed. For example, the Command Translator can be physically implemented as part of the RSC Interface Controller (10) or it can be included within the controllers that initiate work requests to the RSC. Furthermore, the translator can be integrated into the same logical cycle as the RSC Command Priority station, or it can be performed in an earlier cycle if the original command is available. For example, in the preferred embodiment, the Pipeline Fast-Path command is available in the second Pipeline stage (C2), thus it can translated prior to the RSC Command Priority cycle.

The use of Command Translation improves interface efficiency in several ways. To begin with, many operations don't need to interrogate the remote side if the desired data resides in the local cache. Therefore, the Command Translator will use the directory status to exclude these types of operations from requesting use of the RSC interface. Secondly, command translation guarantees that data transfers only need to be sent in one direction rather than being transferred once, processed, then returned back to the original side. For example, an I/O Store 64 Byte (Command 28) without translation would result in an unconditional transmission of 64 bytes of data even if the final destination for the data is the local L3 memory. This means the 64 bytes would be transferred to the remote side, merged into the target line, and the updated line would have to come back across the interface again so it could be stored into the L3 memory attached to the local cluster. Our invention optimizes data transfers by using the Local L3 and Directory Status to only send the 64 bytes across the interface if the destination address is the remote L3 memory and the data doesn't reside in the cache. If the data misses the cache, and the target L3 is the local side, then an interrogation is sent to the other side requesting the data be transferred from the remote cache, if it hits in the remote cache. In this scenario no initial data transfer takes place, and data will only come back across the interface if the target line is being held in the remote cache. Even if the data is in the remote cache, the entire operation necessitates only a single data transfer from the remote side to the local side, where it can be merged with the I/O Store data and put away in the local L3 memory. Finally, the third possible scenarios for I/O Stores is the case where the target data resides in a read-only state in both caches. Once again, in this case the I/O Store data can be merged with the local copy of the data so it's unnecessary to transfer any data across the interface. Instead the original command is translated to a Read Only Invalidate command which is forwarded to the Remote Fetch Controller (12a) so that the copy of the data in the remote cache can be marked invalid.

RSC Priority Station

Figure 3A:
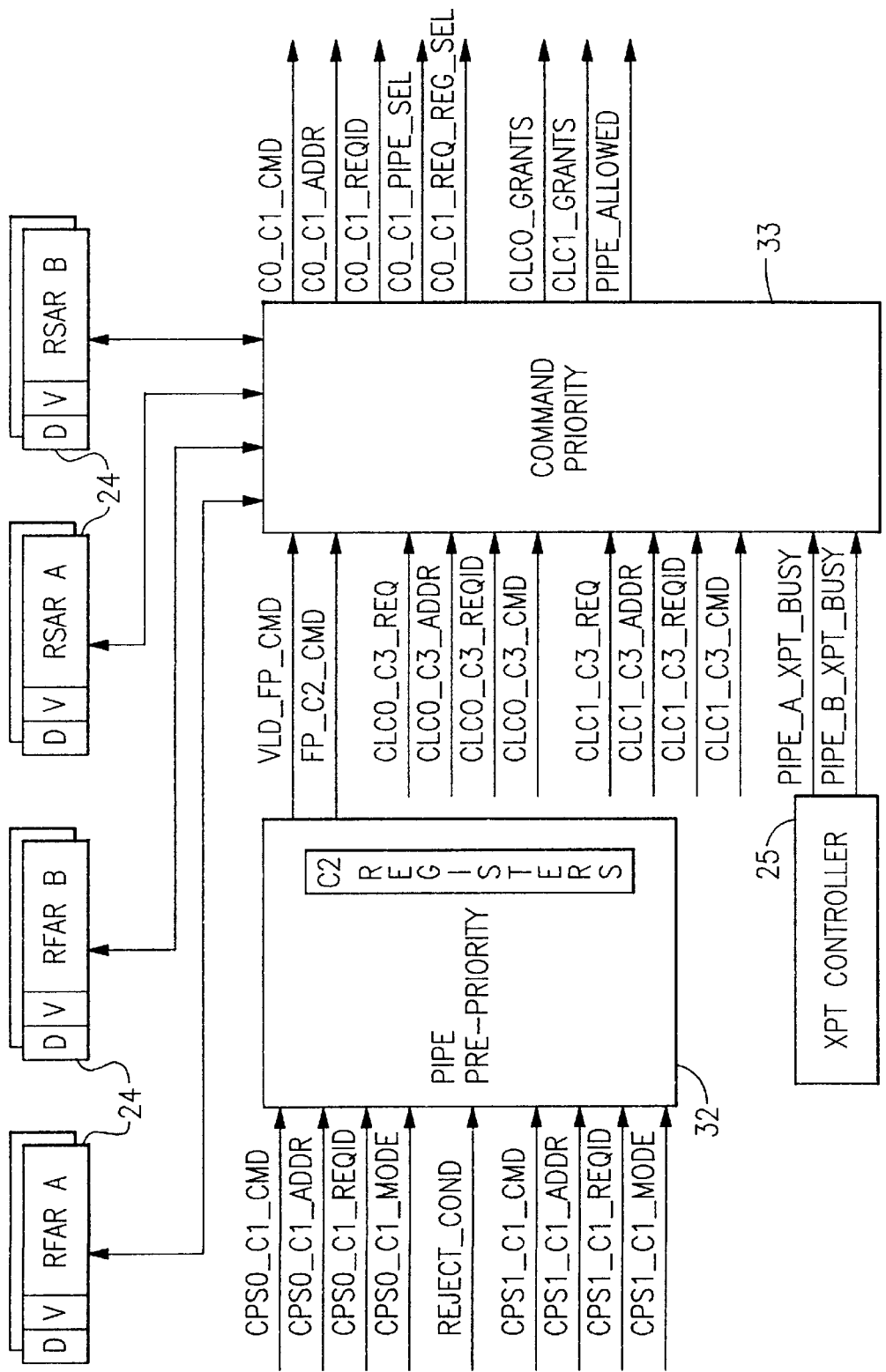
FIG. 3a shows the overall priority station with its Pipeline Pre-Priority station (32) feeding the main Command Priority station (33).

In order to process work requests as efficiently and expediently as possible, the RSC Interface Controller (10) employs a multi-level, intelligent priority station. FIG. 3 shows the overall priority station which consists of a Pipeline Pre-Priority station (32) feeding the main Command Priority station (33). The Pipeline Pre-Priority station monitors the first stage (C1) of both Pipelines looking for Fast-Path candidates. Any CPU fetch command ('01'x–'07'x) is considered a candidate for Fast-Pathing. If either Pipe command is a candidate, it enters the Pre-priority station (32) and competes with the other Pipeline command for selection into the C2 staging area. If only one Pipe has a valid candidate on that cycle, it will automatically be selected. If both Pipes have valid candidates, a simple round-robin determines whose turn is next.

Whenever a Pipe command is selected into the C2 staging area, it is then compared with various interface signals associated with the second Pipeline stage (C2). These C2 Reject signals are comprised of directory status, reject signals from the various CPU Controllers (15) and block Fast-Path signals from the LFSAR Controllers (11). The combination of these signals determines whether the current operation in the C2 staging area should be rejected completely or forwarded to the main Command Priority station (33). Possible causes for rejecting an operation are.:

A CPU Fetch that hits the local directory, with the proper state, which negates the need to interrogate the remote side for the data.

A reject signal from any of the CPU CFAR Controllers (15).

C2 Pipeline Valid being reset.

A block Fast-Path signal from the LFSAR Controller (11).

An invalid address indication from the L3 Memory Configuration Array.

If none of the reject conditions are present, the command is forwarded to the main Command Priority station (33) where it competes with requests from both LFSAR Controllers (11).

As shown in FIG. 3, the Command Priority station (33) receives a set of signals from each LFSAR Controller (11) as well as the Pipeline Fast Path information forwarded from the Pipeline Pre-Priority station (32). In addition, it also interfaces with the eight Resource Registers (24) and the XPT Controller (25) so it can intelligently select a suitable operation.

Basically the operation will always try to select an LFSAR operation if one is pending, and the RSC resource is available. If only a single LFSAR Controller (11) is requesting, and the RSC resource is available, it gets selected. If both LFSAR Controllers (11) are requesting, and only one has the available resources, it will win. If both LFSARs are requesting, and both have available resources, a fetch type of operation will take precedence over a store type. In the event both requests are of the same type, a simple round-robin determines whose turn is next. Finally, if no LFSAR Controllers (11) are requesting, or no resources are available to honor the LFSAR requests, then a Fast-Path request is selected.

Availability of resources varies depending on the type of operation. Fetches are the simplest case since the only resource required is a Remote Fetch Controller (RFAR 12a) corresponding to the Pipeline processing the fetch operation. RFARs could be unavailable because they are busy processing other fetch operations, or because the resource Disable switch could be active. The Command Priority station (33) monitors each RSC Resource's Disable Switch and Valid Bit to determine availability.

To further improve system performance, the priority operation works in conjunction with the Response Handler (22) to maximize the efficiency of remote fetches. Ordinarily a fetch will be dispatched to the next available RFAR Controller (12a) The RFAR on the remote cluster will process the fetch request in the Pipeline and begin loading its data buffer. Simultaneously it will make a request to the RSC IC (10) on the remote side to return the final response and data across the interface. As soon as the final response is transmitted, that RFAR resource is considered available and can accept new work. If a new non-data operation is sent to that RFAR, it can process it while the trailing bytes from the previous fetch are still being read out of the data buffer. However, if the new operation is a second data fetch, it will be recycled through the Pipeline on the remote side continuously until the buffer becomes available.

The present invention circumvents this scenario by ensuring that consecutive data fetches will be sent to alternating RFAR Controllers, if both resources are available at the time the second fetch request arrives. For example, if RFAR A0 is processing the first fetch, and a second fetch arrives while RFAR A0 is still busy, it will be routed to RFAR A1 (assuming RFAR A1 is available). In addition, if RFAR A0 becomes available due to the final response being transmitted, and then the second fetch arrives, it would also be routed to RFAR A1 (since the RFAR A0 buffer is still transferring data). However, if a non-data operation, like a Read-Only Invalidate arrived while RFAR A0 is still busy, it would be routed to RFAR A1. If this is followed by a third operation, which is a data fetch, and RFAR A0 is available, this new data fetch would be sent to RFAR A0, even if the buffer is still busy transferring trailing bytes. In other words the mechanism to alternate the requests to different RFARs is subservient to availability of either resource in the pair.

Figure 3B:
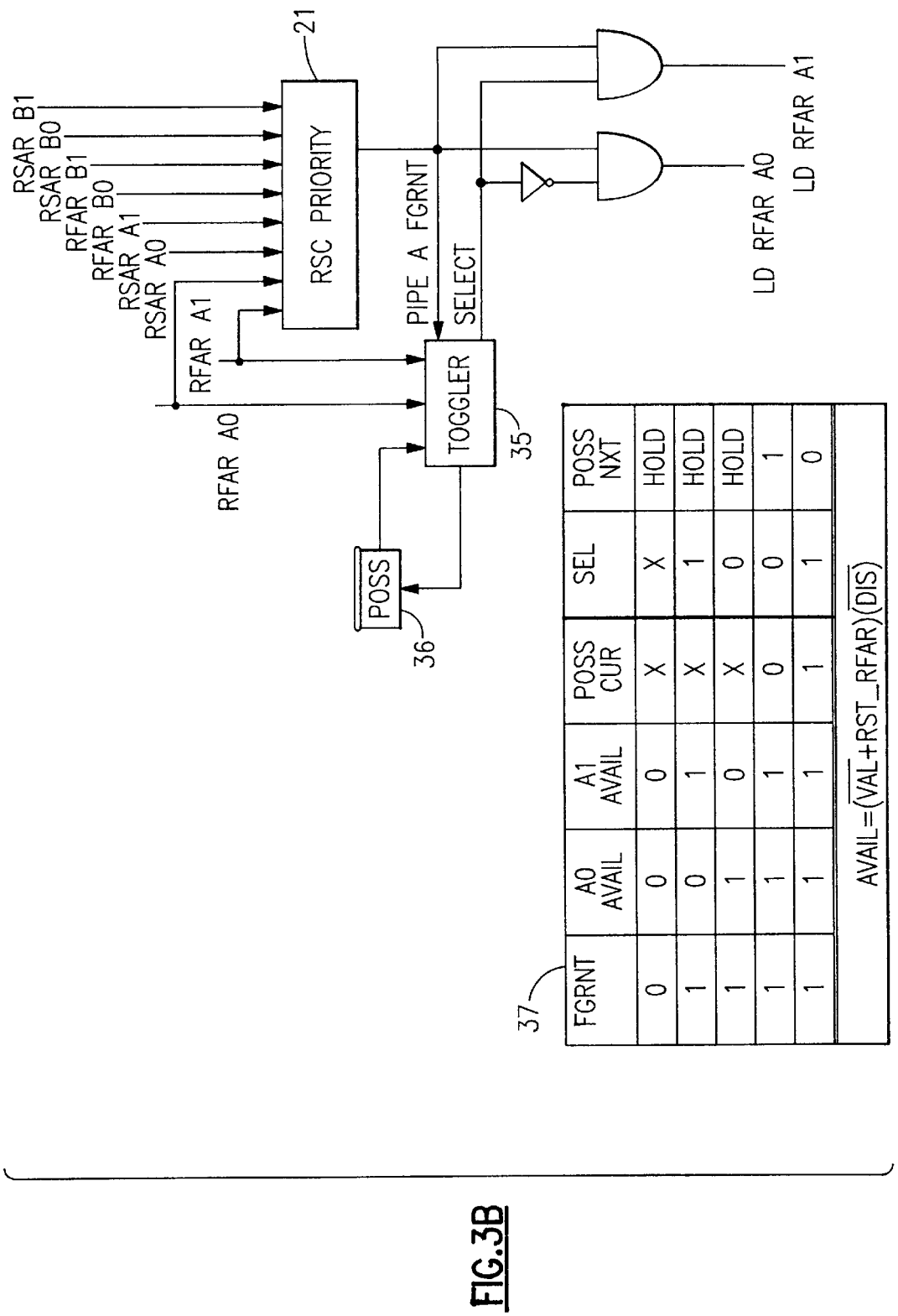
FIG. 3b depicts the logic block diagram showing the interaction between the aforementioned mechanism and the RSC Priority station (21).

FIG. 3b depicts the logic block diagram showing the interaction between the aforementioned mechanism and the RSC Priority station (21). A Resource Toggling function exists within the RSC IC for each pair of RSC Resources (24). A single Resource Toggler (35) representing the RFAR pair for Pipeline A is depicted in FIG. 3b. It receives availability signals from each RFAR Resource (A0 and A1). These availability signals, along with those from the 6 other RSC Resources, also feed the RSC Priority station (21). In addition, the Pipe A fetch grant signal, generated by the RSC Priority station, also feeds the Resource Toggler (35). Finally, the Resource Toggler uses a Toggle Possession Latch (36) to control which one of the resource pair will be assigned the next operation, if the right conditions are present. The Resource Toggler produces a single select signal which is ANDed with the fetch grant signal twice to produce the LOAD RFAR A0 and LOAD RFAR A1 signals that are forwarded to the RFAR A0 and A1 resource registers.

The Toggler Truth Table (37) shown in FIG. 3b describes how the select signal and Toggle Possession Latch (36) are updated. If only one of the two resources is available, the select signal will default to the available resource, regardless of the state of the Toggle Possession Latch (36). If both resources are available, and a fetch grant was issued for this Pipeline, then the present state of the Toggle Possession Latch drives the select signal. Furthermore, the Toggle Latch is updated on the next cycle in anticipation of a subsequent fetch which should be steered to the "other" resource, if it's available. As shown at the bottom of the Toggler Truth Table (37), the available signals are a function of the resource Valid Bit (59a), Disable Bit (59f) and a RST_RFAR_A0 latch which indicates a final response was received for this resource and it is considered "available" on this cycle.

Store type operations are more complex than fetches since they may involve an initial data transfer to accompany the command. The Command Priority station (33) determines part of the availability for Remote Store Controllers (RSAR 12b) in the same manner as RFARs; by testing the Disable Switches and the Valid Bits. The Command Priority station (33) decodes the RSC Base Command to see if it requires a data transfer. If the command does require a data transfer, then the data bus must be tested for availability. In order to pass this test, two conditions must be met.:
 1. The data bus corresponding to the Pipeline issuing the store is not already busy transferring data.
 2. The corresponding RFAR Controller (12a) is not requesting to use the data path to return data for a fetch operations issued from the other cluster.

If both conditions are met, or if the store command does not require use of the data path, such as a read storage key operation, then the resource criteria for the store operation are met.

The aforementioned priority operation ensures that a new operation will be forwarded to the remote side as long as the resource is available. Furthermore, by favoring the LFSAR Controllers (11), it improves the throughput of the LFSAR resources, thereby reducing resource congestion and deadlocks caused by resources that get interlocked waiting on each other to complete. Once an operation is selected, the command (either in its original or remapped codepoint) is sent across the RSC interface with the full 27 bit address. The RSC Command distributor on the remote side routes the command to an RFAR or RSAR depending on the value of bit 0 of the c0_c1_cmd command bus. In addition, c0_c1_pipe_sel and c0_c1 req reg sel are used to steer the command to the selected RFSAR Controller (12a or 12b) associated with the Pipeline processing the operation. This remote resource management technique enables a large number of Storage Controller resources, spread among multiple Pipelines, to utilize a shared RSC Interface using a limited number of I/O.

As stated previously, the co_c1_reqid is the ID of the originating requester which is sent across the interface, but does not take part in the remote management operation. This ID is treated purely as information which is forwarded to the remote side, and passed along to the Storage Controller resource who needs it.

Upon issuing a new RSC operation, the Command Priority station (33) issues a grant to the corresponding LFSAR Controller (11). In the preferred embodiment a critical timing path is alleviated by delaying this grant by one cycle. However, this delay means that the request line from the LFSAR Controller will be active one cycle longer than necessary. The RSC Priority station takes this into account when analyzing the requests for the next operation, such that it won't waste a cycle selecting that same operation again. There are two types of grants issued to each LFSAR Controller (11), which clearly denotes what has transpired in the RSC Priority station. A regular grant is issued whenever an LFSAR request is selected, while a special Fast-Path grant is issued if a Pipeline Fast-Path command is chosen.

RSC Resource Registers

Figure 4:
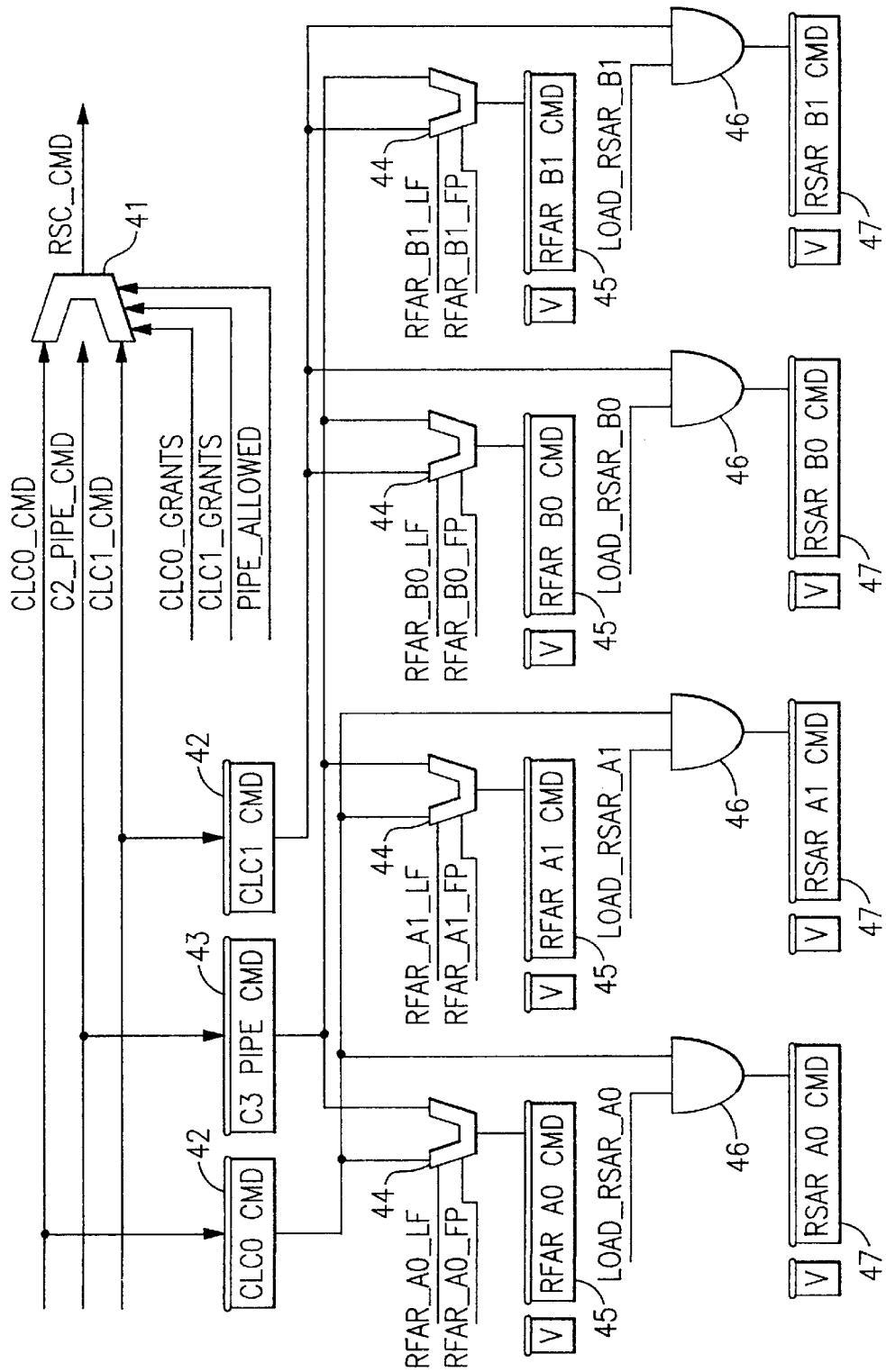
FIG. 4 illustrates how the command is staged into the proper resource holding registers.

Once the RSC Priority station (21) selects a command to send across the interface, the command and its associated information (LFSAR ID, Requestor ID and LFSAR Buffer ID) are loaded into the appropriate RSC resource register. FIG. 4 illustrates how the command is staged into the proper holding register. The purpose of the CLC Command (42) and the C3 Pipe Command (43) staging registers is to alleviate the timing on critical path through the 3-way mux (41) in the upper right corner of FIG. 4. All CLC commands originate from the LFSAR Controllers (11) and are timing critical. In order to improve overall system performance, remote operations are sent across the interface in a single cycle. Since this same command must traverse the priority logic and a small crosspoint switch to reach the appropriate RSC Resource register, this presents a challenging path. The preferred embodiment resolves this by staging the incoming CLC commands and the Pipe command prior to sending it through the crosspoint switch.

Turning our attention to FIG. 4 in greater detail, the commands associated with each LFSAR Controller (11) request are staged into the CLC Command staging registers (42). In parallel, the C2 Pipeline command selected by the Pipeline Pre-Priority station (32) is staged into the C3 Pipe Command staging register (43). Also in parallel, the CLC and Pipe commands flow through the 3-way Mux (41). This mux is controlled by the grant lines coming from the Command Priority station (33). Each CLC command can be loaded into either of the two RFAR Command (45) or RSAR Command (47) registers associated with that CLC's Pipeline. This means each CLC command has four possible destinations. Since Fast-Path commands are restricted to CPU fetch operations, they can only be loaded into the two RFAR Command(45) registers. The commands are routed through the crosspoint switch which is comprised of 2-way Mux (44) and Gateway (46). The 2-way Mux is controlled by signals which select between the CLC Command (42) and C3 Pipe Command (43) registers. The Gateway (46) is controlled by a single gating line which allows the CLC Command (42) to pass through. All of these control signals are orthogonal and result from combining the grant of the chosen RSC operation with the priority logic that selects the next available resource.

Figure 5:
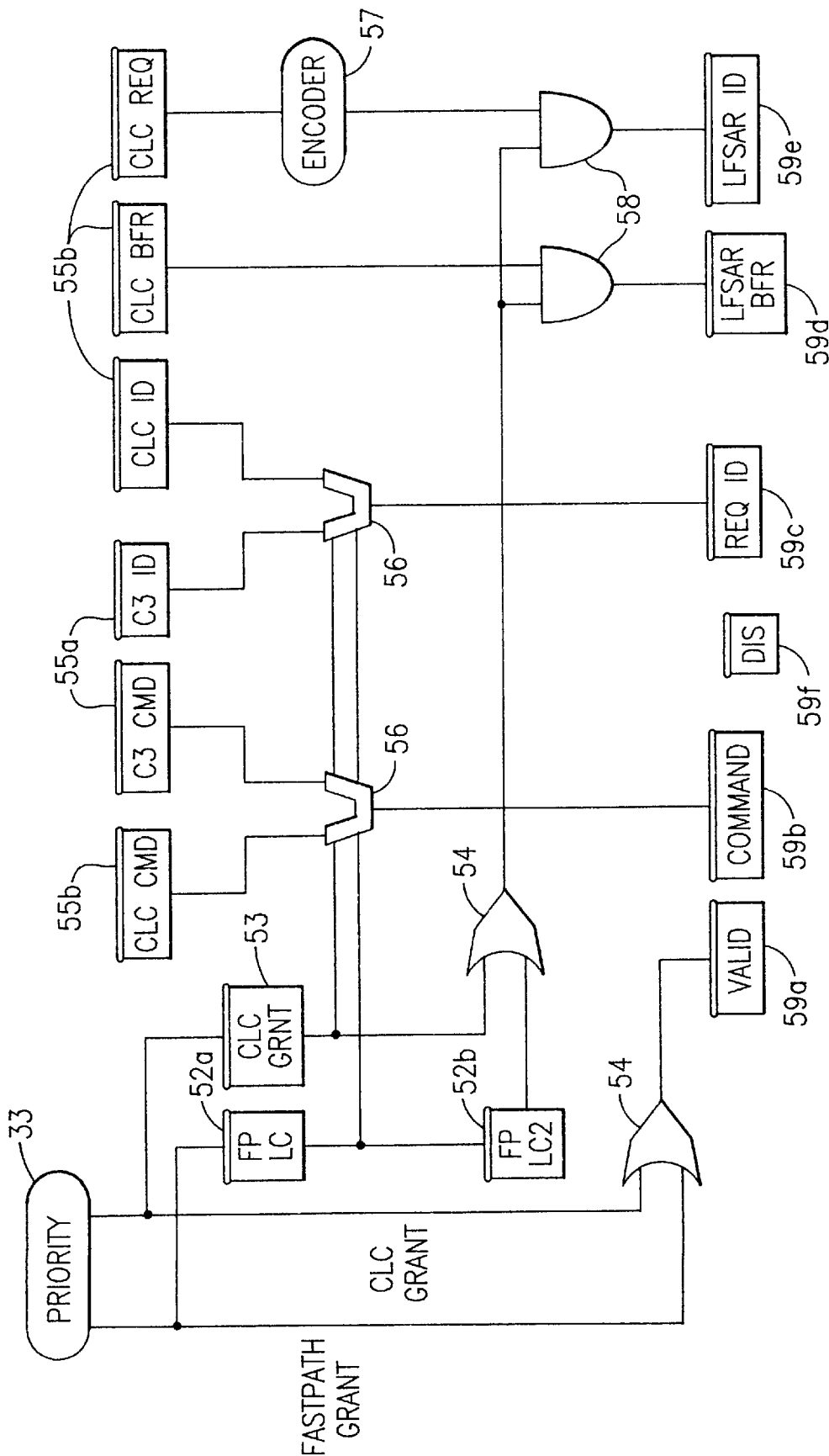
FIG. 5 depicts a detailed view of a single Set of Resource Registers (59a through 59f) which provides a Disable bit, a Valid bit, the Command register, the original Requestor ID register, the LFSAR Controller ID register and the LFSAR Buffer register.

The RSC contains eight Resource Registers (24) which handle all cross-cluster operations. This permits two fetch and two store operations for each Pipeline to occur simultaneously. Since the entire operation is tracked by the local RSC Interface Controller (10), all the information required to complete the operation must be held within the Resource Registers (24). FIG. 5 depicts a detailed view of a single Set of Resource Registers (59) which consists of a Disable bit, a Valid bit, the Command register, the original Requestor ID register, the LFSAR Controller ID register and the LFSAR Buffer register. In the preferred embodiment, there are two LFARs and two LSARs for each pipe within the LFSAR Controller (11), but there are only two LFSAR Buffers for each pipe. Therefore the LFSAR Controller (11) must dynamically assign one of the two buffers to each LFSAR ID for every new operation. Hence, the buffer ID must be communicated to the RSC IC (10) with each new request.

It should be noted that one skilled in the art can appreciate how the total number of LFSAR resources, buffers and their relationship to each other has no effect on the present invention. In cases where the number of buffers equals the number of LFSAR resources, and follows a fixed relationship, the RSC IC would not require an extra resource register to track this information. However, there may be other embodiments in which the RSC IC needs to track additional information beyond that illustrated in the preferred embodiment. Regardless of the amount of information that must be tracked in the resource registers, the principles disclosed herein still apply.

Returning to FIG. 5, the diagram illustrates the detail of an RFAR resource which is slightly more complex since it includes both the C3 Fast-Path Staging Registers (55a) and the CLC Staging Registers (55b). FIG. 4 illustrated just the Command portion of the Resource Registers, but depicted all eight Resource Registers. FIG. 5, on the other hand, shows a single Resource but shows how all the information required to track a given RSC operation is loaded into a Resource register. All the control signals emanate from the Command Priority station (33). This diagram uses only the priority grants (which is a subset of the actual signals used) to depict the logical timing of how the various resource registers get loaded.

To begin with the Valid bit (59a) is loaded on the cycle after an operation is issued a grant. The OR gate (54) ensures that the Valid bit is loaded regardless of whether the operation is a regular CLC operation or a Pipeline Fast-Path op. Since the Valid bits play an important role in determining if a resource is available, this assures the resource is marked as unavailable on the next priority cycle. In order to alleviate the timing critical paths caused by fanning the grants out to the entire Set of Resource Registers (59), our invention take advantage of the fact that the remaining information can be delayed before loading.

CLC operations, those which are issued from an LFSAR Controller (11), are the simplest in terms of the logical timing. For these operations, the staged CLC Grant (53) controls the 2-Way Mux (56) and the Gateway (58) through the OR Gate (54). Hence when this grant is active, all information comprising CLC Staging Registers (55b) gets loaded into the remaining Set of Resource Registers (59b thru 59d) on the cycle following the loading of the Valid bit (59a).

Pipeline Fast-Path operations are staged into the C3 Fast Path Staging Registers (55a) of which there are only a C3 Command and Requestor ID register. In this situation, the staged Fast-Path Grant LC (52a) selects the C3 Pipeline Command and Requestor ID through the 2-Way Mux (56) and loads them into the Command (59b) and Requestor ID (59c) Resource registers. Once these Fast-Path operations reach the third stage of the Pipeline, they are loaded into an LFAR resource and assigned to an LFAR Buffer. This is necessary since many CPU Fetch operations require multiple Pipeline passes so an LFAR is required to manage the entire fetch operation. Therefore, once this assignment is known, the LFSAR Controller (11) will raise a special request to the RSC IC (10) on the cycle immediately following the Pipeline Fast-Path operation. Along with the request, the LFSAR interface will contain the LFAR ID and LFAR Buffer ID. The RSC IC uses the Fast-Path Grant LC2 trigger to time when the information will be available in the CLC BFR and CLC REQ registers (55b). This will allow this information to be gated through the Gateway (58) and load into the LFSAR Buffer (59d) and the LFSAR ID (59e) registers on the cycle following the Command (59b) and Requestor ID (59c) registers.

The preferred embodiment also depicts the use of an Encoder (57) which performs an 8-to-3 encoding of the 8 request signals residing in the CLC REQ register, and stores the ID as a 3 bit value in the LFSAR ID register (59e). One additional bit, denoted as the Disable register (59f) is also included for completeness. This single bit register is a scannable register which can also be loaded via the preferred embodiment's Universal Bus (UBUS). Each RSC Resource Register has such a Disable bit which permits the resource to he disabled either permanently or temporarily through microcode, firmware loads, system resets, etc. Although this bit plays no role in the normal system operation of the RSC IC (10), it serves as an aid in engineering debug and interface performance analysis.

Response Handling

The Response Handler (22), shown in FIG. 1b, is responsible for handling all response traffic returning from the remote cluster, and forwarding the appropriate completion signal to the initiator. There are two main types of responses received by the RSC IC (10). Many of the RSC operations include a remote Cross Interrogation (XI) to determine if the data resides in the remote cache. Whenever one of these operations is invoked, the command is received on the other side and enters the remote pipe using a guaranteed priority level. This guaranteed entry into the pipe permits a synchronous relationship to exist between the time the operation is launched across the interface, and the time that the hit/miss result is known. In the present embodiment, the XI response is returned four cycles after the command is presented on the RSC interface.

Figure 6:
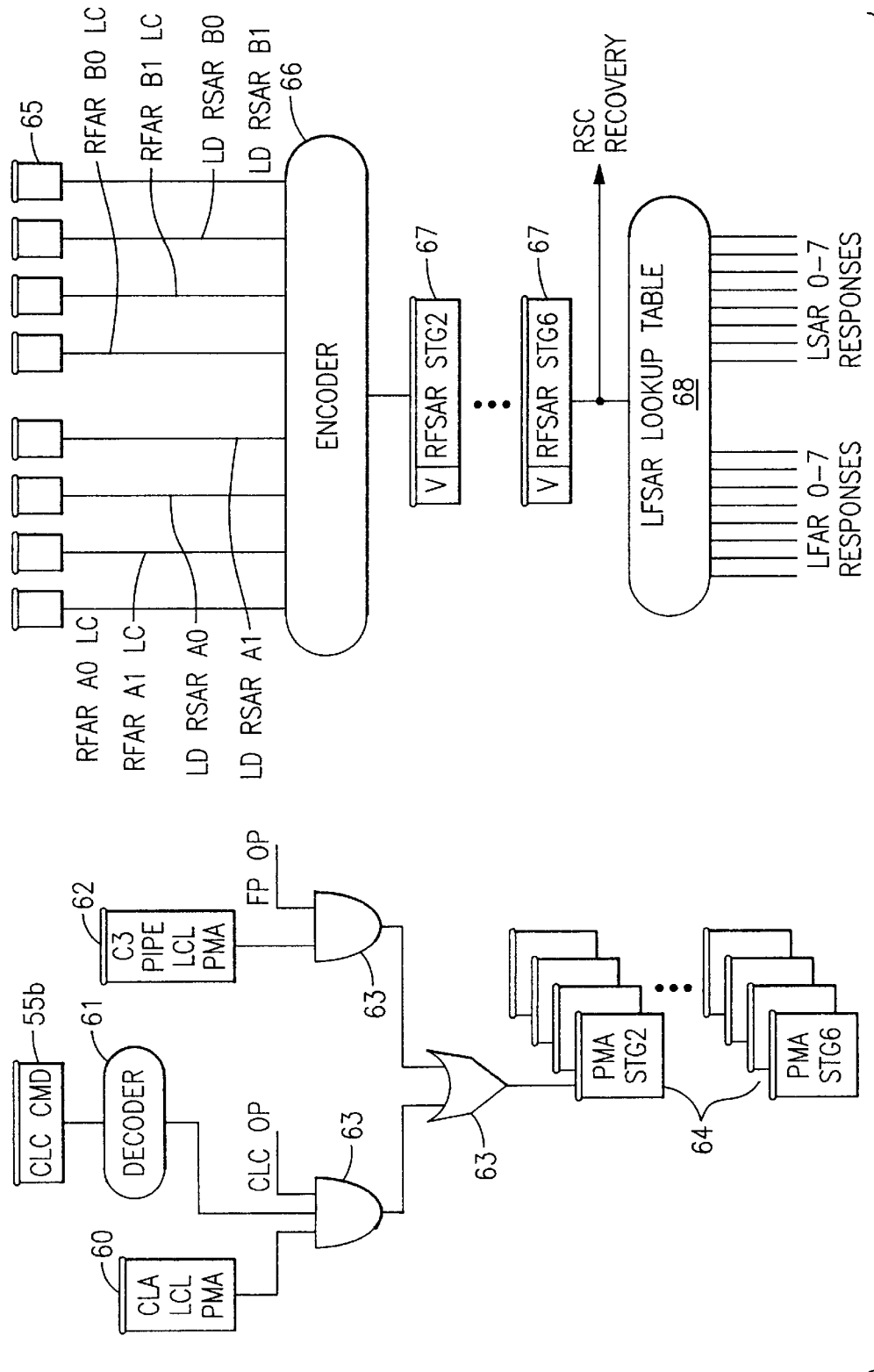
FIG. 6 shows a staging mechanism and how the Response Handler (22) tracks the XI response using the staging mechanism.

Beginning with the RSC Priority (21) cycle, the Response Handler (22) tracks the XI response using the staging mechanism shown in FIG. 6. In order to improve performance on certain types of fetches which miss the local cache, the RSC IC uses an address bit which denotes whether the fetch targets the local L3 or remote L3 memory, coupled with the synchronous interface, to determine whether to automatically retire the operation. For example, if the fetch targets the remote L3, then the RSC resource must remain valid until the operation completes because the desired data will either come from the remote cache or the remote L3 . However, if the address targets the local L3, and the data doesn't reside in the remote cache, then the resource can be freed up to work on a new operation since the data fetch can be handled by the local LFAR controller.

Every cycle each of the CLC Command registers (55b) is analyzed by the Decoder (61) to see if it's one of the fetch commands which require a Cross Interrogation (XI). This result is combined with the CLC Local L3 bit (60) and a signal from the RSC Priority station (21) indicating this CLC Op was issued a grant. In parallel, the C3 Pipe Local L3 bit is compared with a similar signal from the RSC Priority station (21) indicating a Fast-Path operation was issued a grant. By definition all Fast-Path operations require Cross Interrogations. Since the grants are mutually exclusive, only one branch can be active on any cycle. These signals are combined within the 2-Way And/Or Mux (63) in the manner shown, and if the conditions are true, it results in loading 1 bit of the 4 bit L3 Staging Pipeline (64). This pipeline includes a 4 bit staging register for each cycle beginning with Stage 2 and ending with Stage 6. Each of the 4 bits represents one of the RFAR Resources (12a). Although it's not illustrated in FIG. 6, all the elements comprising the function just described are replicated four times with the resulting output feeding each of the Stage 2 bits. Once again, since only one of these RFAR resources can be loaded on any given cycle, the four bits of each stage in the L3 Staging Pipeline (64) are orthogonal. Stage 6 of the pipeline corresponds to the cycle when the XI Response is received by the Response Handler (22). If any of the four bits are active and the XI Response is a miss, then the corresponding RSC Resource Register is reset by turning off the Valid Bit (59a).

In addition to the special L3 Staging Pipeline (64) which is only loaded during a subset of data fetches, FIG. 6 also shows the RFSAR Staging Pipeline (67) which is loaded with every newly initiated RSC operation. Each RSC Resource Register (24) contains a single bit latch indicating that the resource was loaded on the last cycle. These 8 Resource Load Latches (65) are orthogonal since only one resource can be loaded with a new operation each cycle. The outputs of these 8 registers are encoded using the 8-to-3 Encoder (66) and the 3 bit encoded value is stored into the RFSAR Staging Pipe (67). This pipeline also begins with Stage 2 and ends with Stage 6. The 3 bit RSC Resource ID, coupled with a valid bit, is pipelined through the stages each cycle until it reaches Stage 6. The logical timing is such that this ID arrives at Stage 6 which is the same cycle that the XI response and the Remote Interface Error signal are received.

In the case of an interface error, the 3 bit RFSAR ID is decoded and used to reset the RSC Resource Registers (21) involved in the operation. In addition, a hardware Lookup Table (68) is employed to use the 3 bit RSC ID to index into that resource register's LFSAR ID (59e) register. The contents of the LFSAR ID register are further decoded and used to send an interface error signal to the appropriate LFAR or LSAR Controller. For example, if Stage 6 of the RFSAR Staging Pipeline (67) contains a value of "010", this indicates that RSAR 0 of Pipe A is the RSC Resource. The Lookup Table (68) would then decode the LFSAR ID register within the Pipe A RSAR 0 resource, and that value would point to the LSAR associated with this particular operation. The ability to associate a given operation with the corresponding local LFAR or LSAR Controller permits many of the RSC operations to be retried. Often the interface error is intermittent, thus the ability to retry the operation prevents unnecessary system outages.

One additional system performance improvement, which utilizes the RFSAR Staging Pipeline (67) is the Fast Read-Oily Invalidate. One of the RSC Operations is a Read-Only Invalidation in which a read-only copy of the data residing in the cache must be invalidated on the remote side. This occurs, for example, when a CPU wants to fetch data with exclusive ownership and other CPUs have read-only copies of the data. If the other CPUs are on the remote side, the RSC IC will send a Read-Only Invalidate command which the Remote Fetch Controller (12a) on the other cluster will process. Normally this results in a simple Pipeline pass to invalidate the directory entry. Sometimes these initial Pipeline passes result in an address compare against another Controller attempting to access the same line on behalf of a remote CPU. When these conflicts occur there are times when it's safe to allow the CPU which is requesting exclusive ownership to have the data before the conflict is completely resolved. The Remote Fetch Controllers (12a) in the present invention have the ability to detect these "safe" scenarios during the initial Pipeline pass, and inform the RSC IC via the synchronous XI Response bus that it's safe to proceed.

Figure 7:
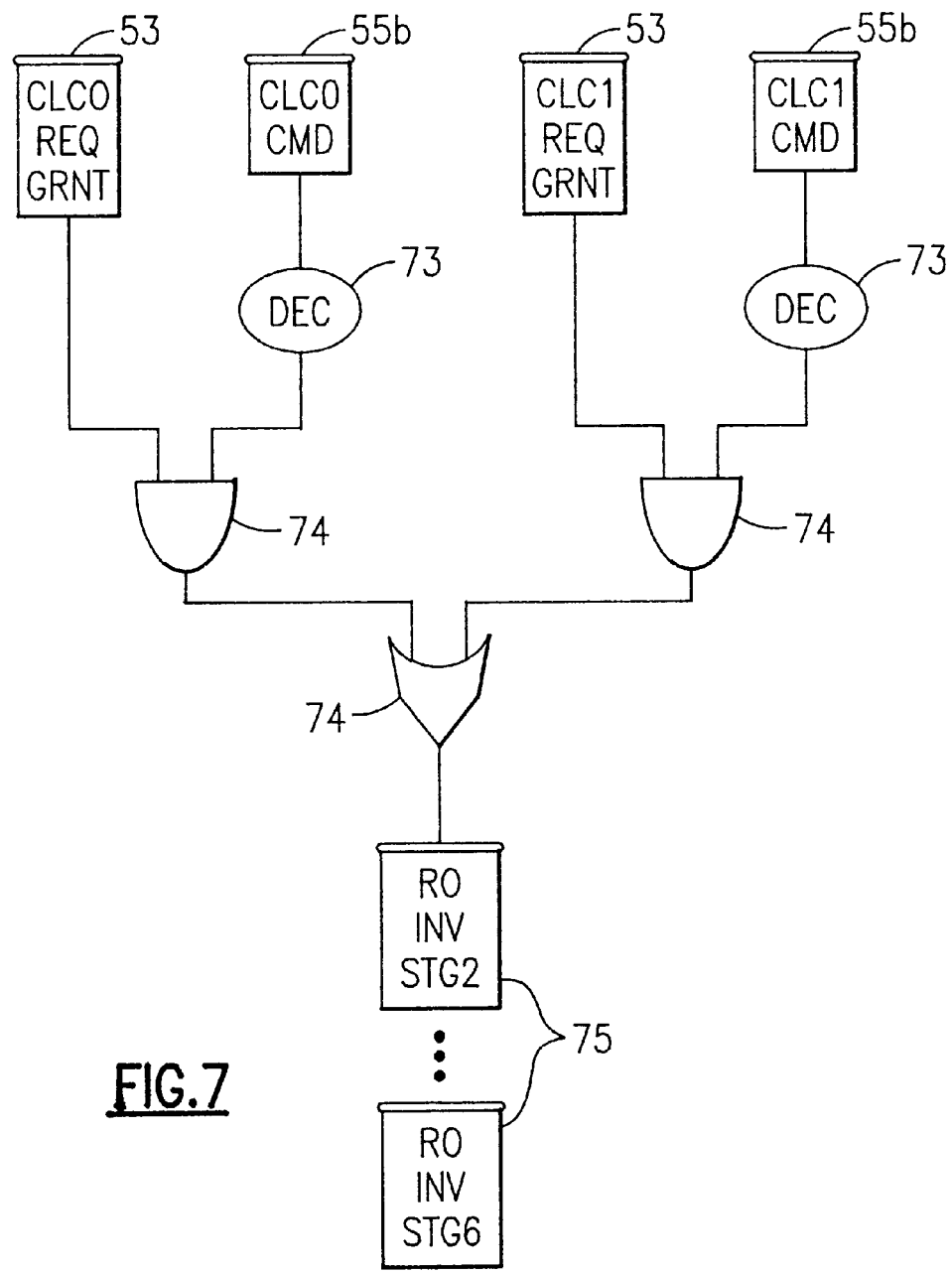
FIG. 7 depicts the Read-Only Invalidate Staging Pipeline (75) which works in a similar fashion to other described staging pipelines.

FIG. 7 depicts the Read-Only Invalidate Staging Pipeline (75) which works in a similar fashion to the other two aforementioned staging pipelines. The CLC Command registers (55b) for both Pipelines are decoded using the ROI Decoder (73) which filters out Read-Only invalidate operations. This, coupled with the CLC Grant (53) indicates that a valid Read-Only operation was initiated. Once again, only one of these can be initiated on any given cycle. The results are fed into the ROI Mux (74) and used to set Stage 2 of the Read-Only Invalidate Staging Pipeline (75). This bit is pipelined down to Stage 6 where it lines up with the XI Response received in the Response Handler (22). If the RO Invalidate Stage 6 bit is active and the XI Response is a miss, the RFSAR Stage 6 Register (63) and the LFSAR Lookup Table(68) are employed to release the associated LFAR Controller and allow it to complete the initial operation. The Remote Fetch Controller continues to process the Read-Only Invalidate so the RSC Resource Valid bit remains active. Once the Remote Fetch Controller (12a) completes the operation, it returns a final response which retires the operation and allows the resource to accept a new piece of work. In the meantime, the LFAR associated with the Read-Only Invalidate may have started a new operation. In order to prevent the final response for the Read-Only Invalidate from being mistaken for a final response for the new LFAR operation, the RSC IC contains holding registers for each RFAR resource. The appropriate holding register is set whenever the Fast Read-Only Invalidate mechanism is used to release an LFAR, and it blocks the forthcoming final response from signaling that LFAR. Once the final response is received, and the operation is officially completed, the holding register is reset along with the remaining resource registers.

All operations in the present invention involving remote operations, other than Cross Interrogates, terminate with an encoded final response. The Response Handler (22) uses the Encoded Response ID bus to match the response with the LFSAR ID who initiated the operation. At a minimum, the RSC IC (10) signals the originating LFSAR Controller that the operation is complete so they can release their resources. In the cases where data is fetched from the remote side, a data advance is sent to the corresponding local LFAR Controller so it can update the local directory status. Additionally, signals are sent to the XPT Controller (25) to permit the RSC XPT codepoint to be sent to the dataflow chips.

A subset of remote operations also require the entire response code to be forwarded to the CFAR Controller (15). For example, the CFAR Controller has to use this single response to send an early and final response back to the Central Processing Unit. Of the seven response bits defined in the present invention, bits 0 and 1 are not included in the actual response value. Instead, they have the following special meaning.:

Bit 0 indicates that the remote operations has been rejected, usually to prevent a deadlock situation. This bit results in a retry signal being sent to the appropriate LFSAR. The LFSAR will attempt to retry the operation at a later time.

Bit 1 indicates the line hit the remote cache in a changed state. This piece of information is used by LFAR during data fetches to calculate the final state of the local directory.

The remaining bits are encoded to indicate various completion codes depending on the initiating operation.

Response Priority

In addition to handling responses returning from the remote side, the RSC IC also employs a Response Priority function to transmit responses to the remote side. These responses are in the form of Cross Interrogate (XI) and final responses for operations initiated from the remote cluster and processed on the local cluster. The local RFAR (12a) and RSAR (12b) Controllers from each Pipeline (for a total of four requesters) present XI Responses and requests to transmit a final response to the RSC IC (10). Cross Interrogates only pertain to fetch operations, therefore only the RFAR Controllers (12a) can present XI Responses. Furthermore, since only one Cross Interrogate can be initiated at a time by the remote side, and since they are guaranteed to process through the Pipeline in a fixed number of cycles, only one of the four possible RFAR XI Responses can be active on any given cycle. Thus, the Response Priority (23) logic simply ORs the four XI Responses together and forwards the output onto the interface.

Final Response requests can emanate from RFAR (12a) and RSAR (12b) Controllers and since remote operations vary widely in length, the responses occur asynchronously. The Response Priorty (23) logic interacts with the RSC Priority station (21) to determine whether any of the final response requests can be honored. For operations other than data fetches, the response logic uses a simple priority operation to choose one of the four RFSARs and forward the response across the interface. If more than one RFSAR issues a request on the same cycle, the operation favors RFARs over RSARs. This improves system performance by ensuring fetch data required by a CPU isn't delayed unnecessarily by RSAR response traffic. In the case where both of the RFARs present requests on the same cycle, the operation uses a round robin to select one of the RFARs. In the case where no RFARs can be honored and more than one RSAR is requesting, a simple round robin chooses an RSAR.

One of the novel aspects of the present invention is the interaction between the Response Priority function (23) and the RSC Priority station (21) to maximize the efficiency of the shared data busses. Since returning fetch data (pertaining to remotely initiated fetches) must share the same data path as locally initiated store operations, the potential exists for a fetch to be delayed while waiting for a store transfer to complete. The Response Priority reduces this potential by performing the following steps for final response requests attempting to return fetch data.

1. It checks to see if the data path corresponding to the requesting RFAR's Pipeline is available. If not, the priority logic will immediately select an RSAR request, if one is pending.
2. If the data path is available, the priority logic will select the RFAR and inform the RSC Priority station to block selection of any pending LSAR Store Operations that include data transfers.

The operations in both priority functions (21 and 23) are cyclically dynamic which means they evaluate the current environment each cycle and make all decisions within a single cycle. Therefore, in cases where a request is delayed due to unavailability of a data path, it will be serviced on the first cycle that it can be serviced. Whenever a request is chosen for transmission across the interface, a grant is sent to the requesting RFSAR so it can drop the current request and issue a new one on the next cycle. In addition to the actual response, the RSC IC also transmits a 3 bit Encoded Response ID bus which indicates which RFSAR is returning the response. The Response Handler (22) on the other side decodes this 3 bit ID to resolve which RSC Resource Register needs to be reset.

All responses cross the RSC interface in a single cycle, however two operations utilize the response bus for additional information. During key operations, the actual key immediately follows the response. During Test Byte Absolute (TBA) operations, the TBA status also follows the response on the next cycle. In either case, the RFSAR Controller transmits a special signal to the RSC IC accompanying the response request which indicates this is a two-cycle operation. This allows the Response Priority to (23) prevent any new RFSAR final responses from being selected during that second cycle.

Crosspoint (XPT) Controller

The RSC interface in our preferred embodiment supports a total of four quadword (QW) data paths. There is one data path in each direction (local to remote and remote to local) for each pipe. Physically, each data path requires two SCD (IBM's storage controller dataflow chips) chips to implement, with each data chip carrying a doubleword (DW) of data. This design is a compromise between a shared bus structure and a truly dedicated point-to-point data flow. Although there are unidirectional data paths in each direction, each data path must multiplex data initiated from both sides of the interface. For example, the data path connecting the remote SC to the local SC could, at any time, be used for returning data in response to a locally initiated fetch request, or it could be used to deliver store data accompanying a store operation initiated by the remote side. Ideally, these operations would be segregated with separate data paths, but packaging limitations prevent this. However, the fact that unidirectional busses exist both ways, for each pipe, does permit the simultaneous movement of four QWs (64 bytes) per cycle.

The RSC IC contains a Crosspoint (XPT) Controller (25) who is responsible for supervising all four data paths. In fact, half of each data path is controlled by the XPT Controller on each cluster. For example, data traveling from the local SC to the remote SC is being driven by the local RSC IC and received by the remote RSC IC. Thus, the driving portion of the XPT bus emanates from the local RSC IC while the receiving portion comes from the remote RSC IC. All four data paths are controlled by an 11 bit control bus where bits (0:5) control the receiving side and bits (6:10) control the driving side. These partial XPT busses are hereafter referred to as the receive XPT (RCV XPT) and driving XPT (DRV_XPT).

Figure 8:
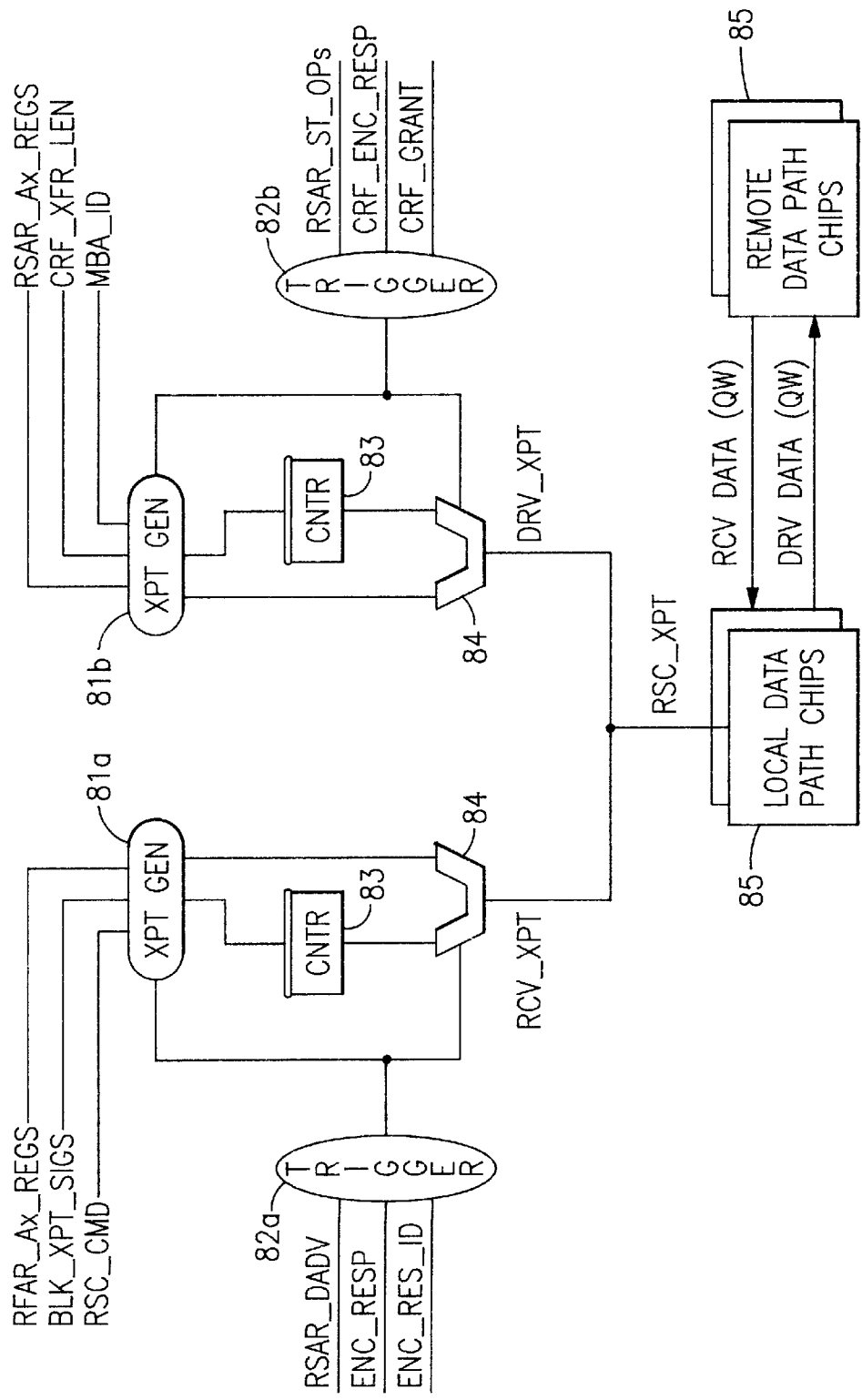
FIG. 8 shows the internal logic of one Pipeline's receiving and driving crosspoint within one RSC IC.

FIG. 8 shows the internal logic of one Pipeline's receiving and driving XPTs within one RSC IC. In order to alleviate critical timing paths, XPT information is set Up in advance whenever possible. The role of the XPT GEN (81a) logic is to use a combination of RSC Resource information and external signals to set up the appropriate data path controls. The Triggers (82a and 82b) act as a gate to release the XPT information onto the RSC XPT bus at exactly the right time with respect to the moving data. The bits of the RSC XPT bus are received by various buffer controllers and crosspoint switches on the data chips. This logic consists of simple decoders which activate buffer address and write controls as well as selectors. Since the data chips have no knowledge of the logical operation behind the data transfer, the RSC XPT bus must be "pulsed" once for each QW being transferred. Thus, if a line of data requires movement, the RSC IC must hold the appropriate value on the RSC XPT bus for 16 consecutive cycles.

Turning our attention to the RCV_XPT portion of the XPT Controller (25), we see the RCV XPT GEN (81a) logic being fed by RFAR resource registers, block_xpt signals and an RSC_CMD. As stated above, data can be received by this SC for two reasons: returning fetch data from a locally initiated request or incoming store data from a remote initiated store op. In the former case, this RSC IC is in charge of the fetch operation and has all the information in a set of RFAR resource registers. The XPT GEN logic uses the information in the Cmd (59b), Req ID (59c), LFAR Buffer (59d) and LFAR ID (59e) registers to calculate the value of the RCV_XPT and determine the data transfer length. If the length is greater than 1 QW, then the XPT_CNTR (83) is loaded with the appropriate number of cycles. All of this occurs shortly after the command is dispatched across the interface. When the data returns, the first QW is always accompanied by an encoded response of '03'x, '23'x, '05'x or '18'–'1B'x. Receipt of one of these responses (with a matching enc_resp_id) into the Trigger Logic (82a), triggers the release of the RCV_XPT onto the RSC_XPT bus. In the cases where multiple QWs are involved, the XPT_CNTR will continue to supply the RCV_XPT value until the count is exhausted. The RCV_XPT will direct the data to the proper CPU port, I/O port, LSAR Buffer and/or LFAR Buffer (for later inclusion into the cache) depending on the operation. Under certain circumstances data destined for a local CPU must be blocked from being sent to the CPU at the last moment. The RSC IC receives several block signals from each LFAR (11) and CFAR (15) controller which are used to suppress the trigger.

The second scenario regarding use of the RCV_XPT bus involves receipt of store data initiated from the remote cluster. Since this is a completely asynchronous event, the XPT GEN (81a) and Trigger Logic (82a) are invoked simultaneously. The RSC IC monitors a portion of the incoming RSC_CMD bus as well as a data advance trigger from the local RSAR controller (121)). If the RSAR_DADV is active and the subset of the command decodes to a proper value, then the RCV_XPT is set up and presented to the RSC XPT bus so the local data path chips can be directed to accept the incoming data and route it to an RSAR Buffer.

The driving XPT (DRV_XPT) works in a similar fashion. Once again, two scenarios require use of this data path. The first involves a locally initiated store operation. In this case, the RSAR resource registers hold all the necessary information to set up the DRV_XPT and load the XPT_CNTR (83), if necessary. An RSAR_ST_OP signal, received by the Trigger Logic (82b), controls the timing of when the data should begin to move with respect to launching the command across the interface. The RSAR on the other side will activate the RSAR_DADV to the remote RSC IC so it can "wake up" and accept the store data. The RSAR_ST_OP signals are simply decodes of the RSAR Command (59b) register to determine if the current operation requires a store data transfer. All store data emanates from the LSAR Buffers on the local side, and the DRV_XPT will control reading of these buffers.

The other scenario involves returning fetch data requested by the other side. Since the source of this data can be an RFAR buffer, the Primary Memory Adapter (PMA) interface or any of the CPU Remote Sense Registers, the XPT GEN (81b) logic uses a combination of signals from the RFAR Controller (12a) in addition to an MBA_ID. A non-zero MBA_ID implies the data will come from the Remote Sense register corresponding to the ID. If the ID is zero, then the various RFAR signals are used to determine whether the data comes from an RFAR buffer or the PMA interface. One of these signals, the PMA_DATA_RDY signal, is raised by the RFAR Controller (12a) during the window of time that data is being transferred from the L3 memory to the Storage Controller. If the Response Priority (23) can process the RFAR Encoded Response request during this window, then the data can bypass the RFAR Buffer and transfer directly to the RSC Interface. On the other hand, if the end of the window is reached before the Response Priority (23) issues a grant to the requesting RFAR, then the PMA_DATA_RDY signal is dropped. The XPT GEN (81b) logic will then route the data into the buffer until such time that the RSC Interface is available and able to move the data from the buffer onto the interface. This aspect of the present invention further improves system performance by eliminating unnecessary buffer loading and unloading during CP Fetches to the remote cluster.

In addition to setting up the DRV_XPT, several signals from the RFAR Controller (12a) comprise the CRF_XFR_LEN bus which permits the data transfer length to be derived. For the returning data cases, the Trigger Logic (82b) is activated by an RFAR Grant from the Response Priority station coupled with an ENC_RESP value indicating "returning fetch data". This allows the DRV_XPT to be released onto the second half of the RSC_XPT bus. Once again, if the transfer length is greater than a one QW, then the XPT_CNTR (83) continuously activates the RSC_XPT until the counter is exhausted.

It should be noted that the asynchronous nature of the RSC leads to frequent conflicts such as the local RSC attempting to initiate a store operation while simultaneously trying to return data for a remote fetch operation. In order to avoid collisions on the data paths, yet maximize performance, the XPT Controller (25) interacts closely with the Priority Stations to ensure that returning fetch data has priority whenever possible. Also, once a data path is in use, the priority station immediately focuses on initiating new operations which don't require the data path in an effort to always keep the work moving between the clusters.

Disable Switches

Each of the RSC Resource registers contains a single bit Disable (59f) latch depicted in FIG. 5. This latch can be scanned to a '1' to permanently disable any combination of the resources. In addition, these latches can also be set through the use of four bits in a UBUS register. The Storage Controller depicted in the preferred embodiment contains a series of these UBUS registers which can be read, written arid modified through firmware and CP millicode. Since the Disable latches can be controlled via one of these millicode controllable UBUS registers, dynamic disabling of the RSC resources can be achieved as part of a millicode routine or a temporary patch. One such use might be comparative performance analysis to determine the effect of the duplicate resources on various workloads.

The lower code points ('1'x thru '6'x) work differently than code points '8'x thru 'F'x. Invoking code points '8'x thru 'F'x simply disables the selected resource by activating the associated disable bit within the RSC IC. Successive UBUS write operations can be used to disable multiple resources in any desired combination. The lower code points result in disable scenarios whereby the priority logic within the RSC IC will monitor the disable mode to restrict the interface activity in the appropriate manner. For example, if mode '2'x is chosen, the priority logic ensures that a second operation will not be launched until the first completes.

While we have described our preferred embodiments of our invention, it will be understood that those skilled in the art, both now and in the future, may make make various improvements and enhancements which fall within the scope of the claims which follow. These claims should be construed to maintain the proper protection for the invention first disclosed.

What is claimed is:

1. A remote resource management system for managing resources in a symmetrical multiprocessing environment comprising, a plurality of clusters of symmetric multiprocessors having interfaces between cluster nodes of the symmetric multiprocessor system, a local interface and interface controller, one or more remote storage controllers each having its local interface controller, and a local-to-remote data bus, a remote resource manager for managing the interface between two clusters of symmetric multiprocessors each of which clusters has a plurality of processors, a shared cache memory, a plurality of I/O adapters and a main memory accessible from the cluster, said remote resource manager managing resources with a remote storage controller to distribute work to a said remote controller acting as an agent to perform a desired operation without requiring knowledge of a requestor who initiated the work request, work being transferred only when a remote requestor is available for processing of the work, without a need for constant communication between said clusters of symmetric multiprocessors.

2. A remote resource management system according to claim 1 having a single interface macro on each cluster responsible for control of interface tasks including prioritizing queued requests, sending new operations across the interface, handling returning responses from the other side, and overseeing the transfer of all data between the clusters, and wherein said local interface controller not only initiates the work request to the remote side, but manages the fetch/store controllers on the remote side, thereby immediately routing the new operation to an available remote controller whereby said remote controller becomes an agent who works on behalf of the local interface controller, who in turn works on behalf of a requester eliminating any need to send information identifying the owner of the operation.

3. A remote resource management system according to claim 2 having a command remapping operation which permits several local operations to be combined into a single atomic remote operation.

4. A remote resource management system according to claim 3 wherein a processor fetch request for a read-only copy of data, and fetch request for read-only data including a storage protection key, require the fetch controller on the remote cluster to utilize identical state diagrams and cache management operations, and said interface controller will remap both of these into a single simplified Remote Storage Cluster (RSC) Interface Controller command known as a Read Only Line Fetch to reduce the number of operations that must be handled by the Remote Storage Cluster Interface Controller (RSC).

5. A remote resource management system according to claim 4 wherein when transferring store data would unnecessarily tie up the local-to-remote data bus and additional control lines would be required to send the directory information, said interface controller remaps the transfer commands into a "force cast out" or a "read-only invalidate" command, based on directory status.

6. A remote resource management system according to claim 1 having an interface with a high-end storage subsystem that contains a large number of fetch and store remote controllers servicing a one or more pipelined hierarchical level caches and wherein a series of priority stations selects a request to send across the interface and when multiple pipes are involved, a pre-priority station in each pipe chooses a fetch or store request to forward to the RSC IC and during the same cycle, the remote storage controller's interface controller employs a priority operation to select the optimal request based on command type and resource availability.

7. A remote resource management system according to claim 6 having for said priority operation, since multiple pipes can request use of the interface on any given cycle, the operation will favor a fetch over a store as long as a remote fetch controller is available; otherwise, the store will be taken as long as a remote store controller is available, and a data path is available for those store operations which require one, and if both requests are fetches, and both have available resources, a round robin determines which request is honored, but in the case of both requests being stores, the winner is determined by whichever pipe has the available resources and if both have all the available resources, the round robin is used.

8. A remote resource management system according to claim 6 having a manager of remote resources within each local Interface Controller, which ensures that interface cycles will not be wasted transmitting work that winds up being queued on the remote side.

9. A remote resource management system according to claim 6 wherein each remote storage controller's local interface controller employs both a synchronous and asynchronous response bus to maintain cache coherency while maximizing performance and wherein an asynchronous response bus is used for all final responses which mark the official end of the remote operation and are often forwarded to the original requester and wherein said final responses are tagged with change line information which permits the local directory to be updated with the correct final state.

10. A remote resource management system according to claim 9 wherein said remote controller's interface controller manager manages all cluster to cluster data flows and compares requests from the local store controller with requests from a resident Remote Fetch controller trying to return fetch data, and wherein during cycles where both compete for the data path, preference is given to the returning fetch data, and wherein in the case where fetch data is acquired from remote main memory, the said remote controller's interface controller manager monitors and manages the corresponding data path as the data is accessed from the memory banks, and when the remote storage controller data path is available, the data will bypass the remote fetch buffer, thereby reducing the normal latency associated with temporarily buffering the data.

11. A remote resource management system according to claim 9 wherein for improving management of remote storage controller resources that have been replicated to improve overall system throughput, said remote controller's interface controller manager manages successive fetch requests that hit a remote cache with alternate work requests between the duplicate Remote Fetch resources, and sends a second fetch request to a duplicate remote controller, if it's available, allowing the duplicate remote controller to begin loading its buffer, while the first remote controller buffer is still completing its data transfer, to permit the second buffer to transfer its data across the interface immediately upon completion of the first buffer's transfer.

12. A remote resource management system according to claim 9 wherein said remote controller's interface controller manager manages a deadlock avoidance mechanism designed to monitor operational sequences which can result in a cross-cluster deadlock, and upon detecting such a scenario, the said remote controller's interface controller manager will reject the pending operation by returning a special reject response back to the initiating cluster, the remote controller's interface controller will, in turn, forward the reject to the originating fetch/store controller so the operation can be retried and continuously rejected and retried until the deadlock window disappears.

13. A remote resource management system according to claim 9 wherein when an interface parity error is detected on any of the control information accompanying a new remote storage controller operation a synchronous interface is used to transmit interface error status within a fixed number of cycles after the command is sent, and in the event of an error, the originating fetch/store controller is notified and subsequently determines the eligibility for recovery, and the remote storage controller's interface controller automatically resets the corresponding remote storage controller's resource to permit the operation to be requested again.

14. A remote resource management system according to claim 1 wherein said system includes a command remapping facility for remapping a superset of commands into a smaller more efficient subset which reduces the complexity of the remote controllers and improves interface efficiency by preventing unnecessary data transfers.

15. A remote resource management system according to claim 14 wherein said command remapping uses flip bits to reduce the required number of gates yet permit the function to be performed within a single logical cycle to improve system performance.

16. A remote resource management system according to claim 6 wherein is provided unified controls for handling locally initiated operations and remote returns which permits outbound and inbound data to share said data bus, thereby reducing interface I/O and yet enabling said bus to be managed in a highly efficient manner with regard to overall system performance.

17. A remote resource management system according to claim 6 wherein said priority operation dynamically analyzes the requests and remote storage controller resources every cycle in order to efficiently balance system performance with interface utilization by favoring fetch requests over store requests, taking into account both locally initiated requests and responses to remotely initiated operations, data path availability for operations that require a data path and only permitting operations to be sent across the interface if an appropriate resource is available.

18. A remote resource management system according to claim 1 wherein the remote resource management manager provides for a synchronous cross interrogate which permits resources to be automatically released within a fixed amount of time in the event of a directory miss in the remote cache; and pipe fast-pathing for CP fetches whereby RSC IC monitors the pipelines looking for CP fetches, and upon finding one, attempts to initiate it one cycle earlier than the normal case wherein the fetch must load into an LFAR Controller prior to being presented to the RSC IC; and supports Early PMA Fetch w/ Cancel in which the local PMA begins fetching the data at the same time the Cross Interrogate is sent across the interface, but in the event of a hit in the remote cache, the RSC IC signals the local LFAR Controller to cancel the early PMA fetch in order to free up the memory interleaves; and Fetch Buffer bypass on a hierarchical cache access, said RSC IC monitoring the cluster-to-cluster data path while the data is being received from the hierarchical cache (PMA), and if said data path is available, the data automatically bypasses the fetch buffer and flows from the PMA receive port directly onto the RSC interface.

19. A remote resource management system according to claim 1 wherein the remote resource management manager provides for using a single crosspoint controller to manage four data paths, capable of 4-way simultaneous data transfers, each of which said data path multiplexes locally initiated and remotely initiated operations, and whereby availability of the data paths is transmitted to a priority mechanism in determining a next operation to dispatch.

20. A remote resource management system according to claim 1 wherein said remote resource management manager provides for:

an accelerated Read Only Invalidate operations whereby the local LFAR Controllers can be released before the remote side completes all the steps required in a read-only invalidation, such that said LFAR Controller is free to begin a new operation including one which may involve sending a remote operation, even a subsequent read-only invalidation;

use of a synchronous interface check to enable RSC resources to be automatically reset in the event of an interface parity error, including the notification of the associated LFAR or LSAR Controller so that said controller can retry the operation, if so desired;

means for cross cluster deadlock avoidance whereby the remote RFAR or RSAR controller detects a potential deadlock and transmits a reject response which is forwarded to the corresponding LFAR or LSAR controller so that said controller can retry the operation;

use of Paired RSC Resources such that consecutive data fetches are distributed to alternating resources in a "pair" of RFAR or RSAR resources, when both members of the pair are available, to assure that the latter fetch will have a remote buffer to begin loading while the trailing bytes of the former fetch are still being processed in the other buffer.

* * * * *